United States Patent
Mevec et al.

(10) Patent No.: US 9,235,724 B2
(45) Date of Patent: *Jan. 12, 2016

(54) SYSTEMS, METHODS, AND COMPUTER MEDIUM TO SECURELY TRANSFER BACKUP DATA BETWEEN PHYSICALLY ISOLATED NETWORKS HAVING DIFFERENT LEVELS OF NETWORK PROTECTION

(71) Applicant: Saudi Arabian Oil Company, Dhahran (SA)

(72) Inventors: Paul Francis Mevec, Dhahran (SA); Ibrahim A. Marhoon, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 14/336,442

(22) Filed: Jul. 21, 2014

(65) Prior Publication Data
US 2015/0261970 A1    Sep. 17, 2015

Related U.S. Application Data

(60) Provisional application No. 61/954,237, filed on Mar. 17, 2014.

(51) Int. Cl.
| | |
|---|---|
| *G06F 21/80* | (2013.01) |
| *G06F 21/62* | (2013.01) |
| *G06F 11/14* | (2006.01) |
| *H04L 29/08* | (2006.01) |
| *G06F 21/78* | (2013.01) |

(52) U.S. Cl.
CPC ........ *G06F 21/6218* (2013.01); *G06F 11/1448* (2013.01); *H04L 67/1097* (2013.01); *G06F 2201/84* (2013.01)

(58) Field of Classification Search
CPC .......... G06F 17/30073; G06F 11/1451; G06F 2221/0782; G06F 17/30584
See application file for complete search history.

(56) References Cited

U.S. PATENT DOCUMENTS

| 7,328,848 B2 | 2/2008 | Xia et al. |
| 7,478,755 B2 | 1/2009 | Sekiguchi |

(Continued)

FOREIGN PATENT DOCUMENTS

| WO | 2008093314 | 8/2008 |
| WO | 2009047556 | 4/2009 |
| WO | 2013101358 | 7/2013 |

OTHER PUBLICATIONS

"DataDiode" Fox-IT, retrieved at https://www.fox-it.com/en/products/datadiode, Jan. 10, 2014, 3 pages.

(Continued)

*Primary Examiner* — Venkat Perungavoor
(74) *Attorney, Agent, or Firm* — Bracewell & Giuliani LLP; Constance G. Rhebergen; Brian H. Tompkins

(57) ABSTRACT

Embodiments of computer-implemented methods, systems, and non-transitory computer-readable medium having one or more computer programs stored therein are provided to transfer data between two or more networks configured to have different levels of network security protection. Large data backup files to be transmitted between the two or more networks can be partitioned into smaller partitioned files, contents of which can be encoded as data barcodes. Generated data barcodes can then be decoded to produce contents of the partitioned files. Decoded contents of the partitioned files can then be securely communicated back to the sender for comparison by generating validation barcodes to be decoded by the sender. Generated verification barcodes can then be decoded to confirm success of the transmission of contents of the partitioned files from the sender. Decoded contents of the partitioned files can be merged and stored responsive to an indication of successful transmission.

21 Claims, 17 Drawing Sheets

(56) References Cited

U.S. PATENT DOCUMENTS

| | | |
|---|---|---|
| 2002/0112181 A1 | 8/2002 | Smith |
| 2007/0182983 A1 | 8/2007 | Wyatt et al. |
| 2011/0210171 A1 | 9/2011 | Brown |
| 2013/0019096 A1 | 1/2013 | Palzer et al. |
| 2013/0086465 A1 | 4/2013 | Boudville |
| 2013/0137510 A1 | 5/2013 | Weber |
| 2013/0152206 A1 | 6/2013 | Staubly |

OTHER PUBLICATIONS

"DualDiode Technology & Owl System Functionality" Owl Computing Technologies, Inc., retrieved at http://www.owlcti.com/dualdiode_technology.html, 1999, 1 page.

"QR Code Essentials" DENSO, 2011, pp. 1-12.

Jones et al. "Secure Data Export and Auditing using Data Diodes" University of Iowa, Department of Computer Science, Iowa City, Iowa, 5 pages.

Poulin, Chris "Data Diodes: Super Security or Super Pain?" retrieved at http://www.securityweek.com/data-diodes-super-security-or-super-pain, Jan. 10, 2012, 8 pages.

Scarbrough et al. "Tennessee Valley Authority's (TVA) Data Diode Program" ICSJWG Spring Conference, May 8-9, 2012, 20 pages.

Sheble, Nicholas "Data Diode Devices Secure Systems" retrieved at http://www.isssource.com/data-diode-devices-secure-systems, Jan. 25, 2012, 5 pages.

International Search Report and Written Opinion for PCT/US2015/020955 dated Jun. 12, 2015.

SYSTEMS, METHODS, AND COMPUTER MEDIUM TO SECURELY TRANSFER BACKUP DATA BETWEEN PHYSICALLY ISOLATED NETWORKS HAVING DIFFERENT LEVELS OF NETWORK PROTECTION

RELATED APPLICATIONS

This application relates to, claims priority to and the benefit of, and incorporates by reference herein U.S. Provisional Patent Application No. 61/954,237, titled "Systems, Methods, and Computer Medium to Securely Transfer Data Between Networks Having Different Levels of Network Protection" and filed on Mar. 17, 2014. This application further relates to, claims priority to and the benefit of, and incorporates by reference herein U.S. Non-Provisional patent application Ser. No. 14/336,154, titled "Systems, Methods, and Computer Medium to Securely Transfer Business Transactional Data Between Networks Having Different Levels of Network Protection Using Barcode Technology with Data Diode Network Security Appliance" and filed the same day, Jul. 21, 2014, and concurrently herewith; U.S. Non-Provisional patent application Ser. No. 14/336,395, titled "Systems, Methods, and Computer Medium to Securely Transfer Business Transactional Data Between Physically Isolated Networks Having Different Levels of Network Protection Utilizing Barcode Technology" and filed the same day, Jul. 21, 2014, and concurrently herewith; and U.S. Non-Provisional patent application Ser. No. 14/336,423, titled "Systems, Methods, and Computer Medium to Securely Transfer Large Volumes of Data Between Physically Isolated Networks Having Different Levels of Network Protection" and filed the same day, Jul. 21, 2014, and concurrently herewith.

BACKGROUND OF THE INVENTION

1. Field of the Invention

Embodiments of the invention relate to computer and data networks and, more particularly, to systems, methods, and non-transitory computer-readable medium having one or more computer programs stored therein to transfer data between networks.

2. Description of the Related Art

Organizations and entities that have multiple networks sometimes protect those networks from unauthorized access by establishing different, higher security or protection levels for one or more networks. For example, an entity may choose to establish stronger protections for one network—such as a process automation system network—that the entity prioritizes as more important, or even essential, to its operations than for another network—such as a corporate business network, for instance. Many industries, entities, and government agencies use one or more networks that require a higher level of security but nevertheless must be able to communicate with other, lower security networks. These high-security networks, therefore, may be physically isolated from other networks. In some circumstances, a high-security network must be totally isolated from other networks. That is, the high-security network must have no path of communication with other networks.

In the process automation industry, for example, network security may be essential to an entity's ability to maintain production at production facilities. It also may be important to the health and security of employees at production facilities, as well as part of environmental protection strategies. It has grown more difficult over time, however, to ensure the integrity of process automation systems. One reason behind the increasing difficulty is that newer process automation systems incorporate open system designs, which are more difficult to protect than legacy process automation systems. Newer process automation systems' combined use of open networking equipment, which transfers data using TCP/IP communication protocols, and widely-used operating systems, such as Microsoft Windows, has meant that corporate business networks and process automation system networks may be seamlessly integrated. That is, ease of communication between corporate business networks and process automation system networks has increased. Although the increased ease of communication may have some advantages, it has also exposed critical process automation system networks to new vulnerabilities.

Process automation and control engineers are constantly working to secure process automation systems from unauthorized intrusion and virus infection. Some of the approaches they use may include, for example, anti-virus patch management, Microsoft Windows patch management, network designs (such as demilitarized zones) that eliminate direct communication between a low-security network and a high-security network, Microsoft Windows operating system hardening, constant firewall and network screening (e.g., 24/7/365), process automation system user accounts and password management, and access control lists for network equipment. Technicians and engineers, for example, may follow a depth in defense strategy, such as the standards outlined in ISA-99, "Industrial Automation and Control Systems Security," or in the United States Department of Homeland Security's "Chemical Facilities Anti-Terrorism Standards," or in standards developed by the Nuclear Regulatory Commission as a protocol or regimen to defend against the unauthorized intrusions. Even when these protective measures are used, however, process automation systems are still vulnerable because data can be transferred from a low-security network, such as a corporate business network, to the process automation system network when data is "written" to the process automation system network for business continuity purposes.

To prevent an intruder or virus from reaching a process automation system network or compromising a process automation system, organizations and other entities have taken several protective measures to prevent a low-security network from "writing" data to the process automation system network through traditional networking practices. For example, entities sometimes use demilitarized zones (DMZs), as illustrated in FIG. 7, for instance. As depicted, a company wide area network 202 is in communication with the Internet 201 and a corporate business server 203, as will be understood by those skilled in the art. Together, the company wide area network 202 and corporate business server 203 may form a corporate network for an entity. A separate process automation system network includes two process automation system servers 221 and 222, which are in communication with one another through a network switch 208. As illustrated in FIG. 7, a DMZ may protect the process automation system network. That is, although data transfer is bidirectional between a facility business server 220 and the process automation system servers 221 and 222, transferred data passes through the network switch 208, a firewall 207, a DMZ router 205, and a DMZ switch 206. Data transfer is also bidirectional between the facility business server 220 and the corporate business server 203, but transferred data passes through a different firewall 204, a DMZ router 205, and a DMZ switch 206.

SUMMARY OF THE INVENTION

Applicants have recognized that although the use of a DMZ, for example, can reduce risks of intrusion or compromise of a high-security network, such as a process automation system network, the use of a DMZ does not eliminate or adequately reduce some types of risks. Consequently, embodiments of systems, methods, and non-transitory computer-readable medium having one or more computer programs stored therein that address these problems and sources of problems are provided herein. Embodiments of the invention, for example, can include systems, methods, and non-transitory computer-readable medium having one or more computer programs stored therein to transfer data between two or more networks configured to have different levels of network protection.

A computer-implemented method to transfer data between two or more networks configured to have different levels of network protection, according to an embodiment of the invention, for example, can include partitioning each of one or more relatively large data backup files into a set of two or more relatively smaller partitioned files. The one or more relatively large data backup files can be associated with and positioned within a first network, for example. Further, the two or more relatively smaller partitioned files of each of the one or more relatively large data backup files can collectively define a plurality of partitioned files. A method can also include decoding a plurality of data barcodes. Each of the plurality of data barcodes can be indicative of contents of one of the plurality of partitioned files, for example. Consequently, decoding the plurality of data barcodes can produce contents of the plurality of partitioned files represented by the plurality of data barcodes. Decoding the plurality of data barcodes can be responsive to receipt of a scan of a display of a first computer in communication with and positioned within the first network. The scan of the display of the first computer can be by use of one or more barcode scanning devices in communication with a second computer. Further, the second computer can be positioned remote from the first computer and in communication with and positioned within a second network. The second network, in turn, can be configured to have a different level of network security protection than the first network. The second network can also be configured to allow only one-way secure communication from the second network to the first network.

A method can also include decoding a plurality of validation barcodes indicative of contents of one or more validation files. Decoding the plurality of validation barcodes can thus produce contents of the one or more validation files represented by the plurality of validation barcodes. The one or more validation files can be configured to include decoded contents of the plurality of partitioned files. Decoding the plurality of validation barcodes can also be responsive to receipt of a scan of a display of the second computer by use of a different one or more barcode scanning devices in communication with the first computer. As a result, decoding the plurality of validation barcodes can thereby securely communicate decoded contents of the the plurality of partitioned files in one-way communication from temporary storage associated with the second network to the first network.

A method can further include decoding one or more verification barcodes indicative of contents of one or more verification files. Decoding the one or more verification barcodes can thus produce contents of the one or more verification files represented by the one or more verification barcodes. The one or more verification files can be configured to indicate whether successful transmission of contents of each of the plurality of partitioned files from the first network to the second network has occurred. Additionally, decoding the one or more verification barcodes can further be responsive to receipt of a scan of the display of the first computer by use of the one or more barcode scanning devices in communication with the second computer.

A method can still further include merging decoded contents of each set of two or more relatively smaller partitioned files into a reassemblage of the respective one of the one or more relatively large data backup files, responsive to an indication from decoded contents of the one or more verification files of successful transmission of contents of each of the plurality of partitioned files from the first network to the second network. A method can then include storing each reassemblage of the one or more relatively large data backup files in more permanent storage associated with the second network, responsive to an indication from decoded contents of the one or more verification files of successful transmission of contents of each of the plurality of partitioned files from the first network to the second network.

In some circumstances, the plurality of partitioned files can be individually separate from one another, and each of the one or more relatively large data backup files can include more than 1 MB of data. In addition, in some instances, each reassemblage of the one or more relatively large data backup files can include a copy of the respective one of the one or more relatively large data backup files. Further, each barcode of the plurality of data barcodes, the plurality of validation barcodes, and the one or more verification barcodes can be distinct from other barcodes of the plurality of data barcodes, the plurality of validation barcodes, and the one or more verification barcodes. Additionally, securely communicating decoded contents of the plurality of partitioned files in one-way communication from the temporary storage associated with the second network to the first network by use of the plurality of validation barcodes can thereby allow comparison to contents of each of the plurality of partitioned files positioned within the first network to determine whether one or more transmission errors exist in decoded contents of the plurality of partitioned files.

Further, a method can include additional steps. For example, a method can also include transferring decoded contents of the plurality of partitioned files to the temporary storage associated with the second network after decoding the plurality of data barcodes. A method can further include storing decoded contents of the plurality of partitioned files in the one or more validation files in the temporary storage associated with the second network after decoding the plurality of data barcodes. In addition, a method can include—after decoding the plurality of validation barcodes—transferring decoded contents of the one or more validation files to temporary storage associated with the first network. Transferring decoded contents of the one or more validation files can thereby transfer decoded contents of the plurality of partitioned files to the first network for comparison to contents of the plurality of partitioned files. In some circumstances, a method can further include generating the plurality of data barcodes on the display of the first computer, for example, as well as generating the plurality of validation barcodes on the display of the second computer. A method can also include generating the one or more verification barcodes on the display of the first computer, responsive to a comparison of (1) the securely communicated decoded contents of the plurality of partitioned files and (2) contents of the plurality of partitioned files positioned in the first network. A method can still further include discarding decoded contents of the plurality of partitioned files in the temporary storage associated with the second network. Discarding decoded contents of the plurality of partitioned files in the temporary storage associated with the second network can be responsive to an indication—from decoded contents of the one or more verification files—of unsuccessful transmission of contents of each of the plurality of partitioned files from the first network to the second network.

In addition, the one or more barcode scanning devices in communication with the second computer can be configured to scan a plurality of barcodes simultaneously, and the one or more barcode scanning devices in communication with the first computer also can be configured to scan a plurality of barcodes simultaneously. Further, the plurality of data barcodes can be physically positioned separate from one another when generated on the display of the first computer. Similarly, the plurality of validation barcodes can be physically positioned separate from one another when generated on the display of the second computer. Likewise, the one or more verification barcodes can be physically positioned separate from one another when generated on the display of the first computer. Additionally, the plurality of data barcodes can be distinct from the plurality of validation barcodes and the one or more verification barcodes, and the plurality of validation barcodes can be distinct from the plurality of data barcodes and the one or more verification barcodes.

Successful transmission of contents of each of the plurality of partitioned files from the first network to the second network can occur, for example, when the securely communicated decoded contents of each of the plurality of partitioned files match contents of one of the plurality of partitioned files positioned in the first network and when contents of each of the plurality of partitioned files positioned in the first network match the securely communicated decoded contents of one of the plurality of partitioned files. In some circumstances, the first network can include a high-security network, and the second network can include a low-security network. Conversely, in other circumstances, the first network can include a low-security network, and the second network can include a high-security network. Further, in some instances, decoding the plurality of data barcodes can include disregarding error-correction capabilities of the plurality of data barcodes.

Barcodes and a barcode scanning device can include additional distinctive features. For example, in some cases, the plurality of data barcodes, the plurality of validation barcodes, and the one or more verification barcodes can include one or more of the following: two-dimensional matrix codes, QR Codes, Aztec Codes, and PDF417 codes. In addition, a barcode scanning device can include one or more of the following: a barcode reading device, a QR Code reading device, a field-of-view barcode reading device, and a camera.

An embodiment can also include systems to transfer data between two or more networks configured to have different levels of network protection. For example, a system can include a first computer and a second computer. The first computer can be in communication with and positioned within a first network, and the second computer can be positioned remote from the first computer and in communication with and positioned within a second network. The first computer, for example, can include one or more processors and one or more barcode scanning devices in communication with the one or more processors. The first computer can also include one or more displays in communication with the one or more processors and non-transitory memory medium in communication with the one or more processors. The memory medium can include computer-readable instructions stored therein that when executed cause the first computer to perform a series of steps, such as partitioning each of one or more relatively large data backup files associated with and positioned within the first network into a set of two or more relatively smaller partitioned files. The two or more relatively smaller partitioned files of each of the one or more relatively large data backup files can collectively define a plurality of partitioned files, for example. The steps can also include decoding a plurality of validation barcodes indicative of contents of one or more validation files. Decoding the plurality of validation barcodes can be responsive to receipt of a scan of one or more of one or more displays of the second computer by use of the one or more barcode scanning devices of the first computer. Further, decoding the plurality of validation barcodes can produce contents of the one or more validation files represented by the plurality of validation barcodes.

The second network can be configured to have temporary storage and separate more permanent storage associated therewith. In addition, the second network can be further configured to have a different level of network security protection than the first network and to allow only one-way secure communication from the second network to the first network. The second computer, for example, can include one or more processors and one or more input and output units in communication with the one or more processors of the second computer. The second computer can further include one or more displays in communication with the one or more processors of the second computer and another different one or more barcode scanning devices in communication with the one or more processors of the second computer. Additionally, the second computer can include non-transitory memory medium in communication with the one or more processors of the second computer. The memory medium of the second computer can include computer-readable instructions stored therein that when executed cause the second computer to perform a series of steps.

For example, the steps performed by the second computer can include decoding a plurality of data barcodes indicative of contents of one of the plurality of partitioned files. Decoding the plurality of data barcodes can thus produce contents of the plurality of partitioned files represented by the plurality of data barcodes. Decoding the plurality of data barcodes can further be responsive to receipt of a scan of one or more of the one or more displays of the first computer by use of the one or more barcode scanning devices of the second computer. The steps can also include generating the plurality of validation barcodes on one or more of the one or more displays of the second computer. The one or more validation files can be configured to include decoded contents of the plurality of partitioned files. As a result, generating the plurality of validation barcodes can thereby securely communicate decoded contents of the plurality of partitioned files in one-way communication from the temporary storage associated with the second network to the first network. The steps can further include decoding one or more verification barcodes indicative of contents of one or more verification files. The one or more verification files can be configured to indicate whether successful transmission of contents of the plurality of partitioned files from the first network to the second network has occurred. Decoding the one or more verification barcodes can be responsive to receipt of a scan of one or more of the one or more displays of the first computer by use of the one or more barcode scanning devices of the second computer. The steps can then include merging decoded contents of each set of two or more relatively smaller partitioned files into a reassemblage of the respective one of the one or more relatively large data backup files, responsive to an indication from decoded contents of the one or more verification files of successful transmission of contents of each of the plurality of partitioned files from the first network to the second network. The steps can still further include storing each reassemblage of the one or more relatively large data backup files in the more permanent storage associated with the second network, responsive to an indication from decoded contents of the one or more verification files of successful transmission of contents of each of the plurality of partitioned files from the first network to the second network.

Additionally, in some instances, the plurality of partitioned files can be individually separate from one another. Further, each of the one or more relatively large data backup files can include more than 1 MB of data, and each reassemblage of the one or more relatively large data backup files can include a copy of the respective one of the one or more relatively large data backup files. In some circumstances, each barcode of the plurality of data barcodes, the plurality of validation barcodes, and the one or more verification barcodes can be distinct from other barcodes of the plurality of data barcodes, the plurality of validation barcodes, and the one or more verification barcodes. In addition, securely communicating decoded contents of the plurality of partitioned files in one-way communication from the temporary storage associated with the second network to the first network by use of the plurality of validation barcodes can thereby allow comparison to contents of each of the plurality of partitioned files positioned within the first network to determine whether one or more transmission errors exist in decoded contents of the plurality of partitioned files.

In some circumstances, the memory medium of the first computer can also include computer-readable instructions stored therein that when executed cause the first computer to perform additional steps, such as generating the plurality of data barcodes on one or more of the one or more displays of the first computer. Additional steps performed by the first computer can also include transferring decoded contents of the one or more validation files to temporary storage associated with the first network after decoding the plurality of validation barcodes. Transferring decoded contents of the one or more validation files can thereby transfer decoded contents of the plurality of partitioned files to the first network for comparison to contents of the plurality of partitioned files. Other steps performed by the first computer can also include generating the one or more verification barcodes on one or more of the one or more displays of the first computer, responsive to a comparison of (1) the securely communicated decoded contents of the plurality of partitioned files and (2) contents of the plurality of partitioned files positioned in the first network. Similarly, the memory medium of the second computer can further include computer-readable instructions stored therein that when executed cause the second computer to perform additional steps. Additional steps performed by the second computer can include, for example, transferring decoded contents of the plurality of partitioned files to the temporary storage associated with the second network after decoding the plurality of data barcodes, as well as storing decoded contents of the plurality of partitioned files in the one or more validation files in the temporary storage associated with the second network after decoding the plurality of data barcodes. Other steps performed by the second computer can also include discarding decoded contents of the plurality of partitioned files in the temporary storage associated with the second network, responsive to an indication from decoded contents of the one or more verification files of unsuccessful transmission of contents of each of the plurality of partitioned files from the first network to the second network.

Successful transmission of contents of each of the plurality of partitioned files from the first network to the second network can occur, for example, when the securely communicated decoded contents of each of the plurality of partitioned files match contents of one of the plurality of partitioned files positioned in the first network and when contents of each of the plurality of partitioned files positioned in the first network match the securely communicated decoded contents of one of the plurality of partitioned files. Additionally, the one or more barcode scanning devices of the second computer can be configured to scan a plurality of barcodes simultaneously, and the one or more barcode scanning devices of the first computer similarly can be configured to scan a plurality of barcodes simultaneously. Further, the plurality of data barcodes can be physically positioned separate from one another when generated on the one or more of the one or more displays of the first computer, and the plurality of validation barcodes can be physically positioned separate from one another when generated on the one or more of the one or more displays of the second computer. Likewise, the one or more verification barcodes can be physically positioned separate from one another when generated on the one or more of the one or more displays of the first computer. Further, the plurality of data barcodes can be distinct from the plurality of validation barcodes and the one or more verification barcodes, and the plurality of validation barcodes can be distinct from the plurality of data barcodes and the one or more verification barcodes.

In some circumstances, the first network can include a high-security network, and the second network can include a low-security network. In other circumstances, the first network can include a low-security network, and the second network can include a high-security network. Decoding the plurality of data barcodes, in some instances, can include disregarding error-correction capabilities of the plurality of data barcodes. Further, the plurality of data barcodes, the plurality of validation barcodes, and the one or more verification barcodes can include one or more of the following: two-dimensional matrix codes, QR Codes, Aztec Codes, and PDF417 codes. A barcode scanning device can also include one or more of the following: a barcode reading device, a QR Code reading device, a field-of-view barcode reading device, and a camera.

An embodiment of the invention can additionally include non-transitory computer-readable medium having one or more computer programs stored therein operable by one or more processors to transfer data between two or more networks configured to have different levels of network protection. The one or more computer programs, for example, can include a set of instructions that, when executed by the one or more processors, cause the one or more processors to perform operations. Those operations can include partitioning each of one or more relatively large data backup files into a set of two or more relatively smaller partitioned files. The two or more relatively smaller partitioned files of each of the one or more relatively large data backup files can collectively define a plurality of partitioned files. Further, the one or more relatively large data backup files can be associated with and positioned within a first network. The operations can also include decoding a plurality of data barcodes each indicative of contents of one of the plurality of partitioned files. Decoding the plurality of data barcodes can be responsive to receipt of a scan of a display of a first computer in communication with and positioned within the first network. A scan of the display of the first computer can be by use of one or more barcode scanning devices in communication with a second computer. The second computer can be positioned remote from the first computer and in communication with and positioned within a second network. Further, the second network can be configured to have a different level of network security protection than the first network and to allow only one-way secure communication from the second network to the first network. Decoding the plurality of data barcodes can thus produce contents of the plurality of partitioned files represented by the plurality of data barcodes.

The operations can further include decoding a plurality of validation barcodes indicative of contents of one or more validation files. Decoding the plurality of validation barcodes can thus produce contents of the one or more validation files represented by the plurality of validation barcodes. The one or more validation files can be configured to include decoded contents of the plurality of partitioned files. Decoding the plurality of validation barcodes can be responsive to receipt of a scan of a display of the second computer. A scan of the display of the second computer can be by use of a different one or more barcode scanning devices in communication with the first computer, for example. Consequently, decoding the plurality of validation barcodes can thereby securely communicate decoded contents of the plurality of partitioned files in one-way communication from temporary storage associated with the second network to the first network.

The operations can also include decoding one or more verification barcodes indicative of contents of one or more verification files. Decoding the one or more verification barcodes can thus produce contents of the one or more verification files represented by the one or more verification barcodes. Further, the one or more verification files can be configured to indicate whether successful transmission of contents of the plurality of partitioned files from the first network to the second network has occurred. Decoding the one or more verification barcodes can be responsive to receipt of a scan of the display of the first computer by use of the one or more barcode scanning devices in communication with the second computer. The operations can then include merging decoded contents of each set of two or more relatively smaller partitioned files into a reassemblage of the respective one of the one or more relatively large data backup files, responsive to an indication from decoded contents of the one or more verification files of successful transmission of contents of each of the plurality of partitioned files from the first network to the second network. The operations can further include storing each reassemblage of the one or more relatively large data backup files in more permanent storage associated with the second network, responsive to an indication from decoded contents of the one or more verification files of successful transmission of contents of each of the plurality of partitioned files from the first network to the second network.

For example, securely communicating decoded contents of the plurality of partitioned files in one-way communication from the temporary storage associated with the second network to the first network by use of the plurality of validation barcodes can thereby allow comparison to contents of each of the plurality of partitioned files positioned within the first network to determine whether one or more transmission errors exist in decoded contents of the plurality of partitioned files. In some circumstances, the plurality of partitioned files can be individually separate from one another. Further, each of the one or more relatively large data backup files can include more than 1 MB of data, and each reassemblage of the one or more relatively large data backup files can include a copy of the respective one of the one or more relatively large data backup files. In addition, each barcode of the plurality of data barcodes, the plurality of validation barcodes, and the one or more verification barcodes can be distinct from other barcodes of the plurality of data barcodes, the plurality of validation barcodes, and the one or more verification barcodes.

The operations can further include generating the plurality of data barcodes on the display of the first computer, in some circumstances. Further, the operations can include transferring decoded contents of the plurality of partitioned files to the temporary storage associated with the second network after decoding the plurality of data barcodes. The operations can further include storing decoded contents of the plurality of partitioned files in the one or more validation files in the temporary storage associated with the second network after decoding the plurality of data barcodes, as well as generating the plurality of validation barcodes on the display of the second computer. The operations can still further include transferring decoded contents of the one or more validation files to temporary storage associated with the first network after decoding the plurality of validation barcodes. Transferring decoded contents of the one or more validation files can thereby transfer decoded contents of the plurality of partitioned files to the first network for comparison to contents of the plurality of partitioned files. In addition, the operations can include generating the one or more verification barcodes on the display of the first computer, responsive to a comparison of (1) the securely communicated decoded contents of the plurality of partitioned files and (2) contents of the plurality of partitioned files positioned in the first network. Furthermore, the operations can include discarding decoded contents of the plurality of partitioned files in the temporary storage associated with the second network, responsive to an indication from decoded contents of the one or more verification files of unsuccessful transmission of contents of each of the plurality of partitioned files from the first network to the second network.

In some instances, the one or more barcode scanning devices in communication with the second computer can be configured to scan a plurality of barcodes simultaneously, and the one or more barcode scanning devices in communication with the first computer can be configured to scan a plurality of barcodes simultaneously, as well. Further, the plurality of data barcodes can be physically positioned separate from one another when generated on the display of the first computer. Similarly, the plurality of validation barcodes can be physically positioned separate from one another when generated on the display of the second computer, and the one or more verification barcodes can be physically positioned separate from one another when generated on the display of the first computer.

Additionally, successful transmission of contents of each of the plurality of partitioned files from the first network to the second network can occur when the securely communicated decoded contents of each of the plurality of partitioned files match contents of one of the plurality of partitioned files positioned in the first network and when contents of each of the plurality of partitioned files positioned in the first network match the securely communicated decoded contents of one of the plurality of partitioned files. Further, the plurality of data barcodes can be distinct from the plurality of validation barcodes and the one or more verification barcodes, and the plurality of validation barcodes can be distinct from the plurality of data barcodes and the one or more verification barcodes.

In some circumstances, the first network can include a high-security network, and the second network can include a low-security network. In other circumstances, the first network can include a low-security network, and the second network can include a high-security network. Further, decoding the plurality of data barcodes can include disregarding error-correction capabilities of the plurality of data barcodes. In some instances, the plurality of data barcodes, the plurality of validation barcodes, and the one or more verification barcodes can include one or more of the following: two-dimensional matrix codes, QR Codes, Aztec Codes, and PDF417 codes. In addition, a barcode scanning device can include one or more of the following: a barcode reading device, a QR Code reading device, a field-of-view barcode reading device, and a camera.

An embodiment can advantageously enable an entity to establish an air gap between two or more networks, such as a low-security network and a high-security network. An air gap can prevent communication, such as TCP/IP, between two or more networks. Consequently, an air gap between a low-security network and a high-security network can be employed to protect the high-security network from unauthorized access through the low-security network. In particular, an embodiment can be used to transmit large files between a high-security network and a low-security network for data backup purposes. The large files, for instance, can include one or more data backup files. For example, regular maintenance of a high-security network can include backing up files, such as configuration or imaged data. It can be desirable, however, to back up this data to another location that is external to the high-security network for information assurance purposes. An embodiment can enable this backup data to be transmitted to the low-security network. An additional challenge associated with transmission of backup data, though, can be that the data frequently contains large files, the contents of which are often too big to be encoded as a single barcode. An embodiment can therefore provide for large files to be broken apart, i.e., partitioned, before being encoded as barcodes. For example, in some methods according to an embodiment, a method can further include partitioning each of one or more relatively large data backup files into a set of two or more relatively smaller partitioned files, before generating a plurality of data barcodes. A method can also further include, after transferring decoded contents of the plurality of partitioned files to temporary storage associated with the second network, merging decoded contents of each set of two or more relatively smaller partitioned files into a reassemblage of the respective one of the one or more relatively large data backup files. For example, a plurality of large files to be partitioned can include files larger than 1 MB. In that example, files smaller than 1 MB can be encoded in barcodes without first breaking them apart into smaller files. After transferring decoded contents of the plurality of partitioned files to temporary storage associated with the second network, partitioned files can be identified and distinguished from files that were not partitioned, for example. If successful data transmission is indicated, the two or more partitioned files can be merged into files larger than 1 MB and stored along with files smaller than 1 MB, for example. In addition, in some methods according to an embodiment, a method can further include, after decoding the plurality of data barcodes, merging one or more sets of partitioned files into one or more large files. Consequently, an embodiment can enable backups of data stored on a high-security network—even when the data contains large files—for information assurance purposes, for example, while protecting the high-security network from unauthorized access or intrusion.

In some circumstances, a physically secured room can be used to house one or more components of the first computer and the second computer. A physically secured room, e.g., a "clean room," can include a secure, restricted-access room into which removable media is not permitted. Data transfers according to an embodiment of the invention can be performed in a physically secured room, for instance, to further increase security protection of a high-security network. For example, a physically secured room can contain at least a display of the first computer and a barcode scanning device in communication with the second computer. The barcode scanning device can be positioned so as to enable it to capture one or more barcodes on the display of the first computer. A physically secured room can also contain a display of the second computer and a different barcode scanning device in communication with the first computer. The barcode scanning device in communication with the first computer can similarly be positioned so as to enable it to capture one or more barcodes on the display of the second computer. As a result, transmission of data backup files from one network to another, according to an embodiment of the invention, can occur at least partially in a physically secured room environment. The use of a physically secured room can therefore further minimize or eliminate any risk of intrusion or unauthorized access to a high-security network, for example.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

So that the manner in which the features and advantages of the embodiments of methods, systems, and non-transitory computer-readable medium having computer program stored therein of the present invention, as well as others, which will become apparent, may be understood in more detail, a more particular description of the embodiments of methods, systems, and non-transitory computer-readable medium having computer program stored therein of the present invention briefly summarized above may be had by reference to the embodiments thereof, which are illustrated in the appended drawings, which form a part of this specification. It is to be noted, however, that the drawings illustrate only various embodiments of the embodiments of methods, systems, and non-transitory computer-readable medium having computer program stored therein of the present invention and are therefore not to be considered limiting of the embodiments of methods, systems, and non-transitory computer-readable medium having computer program stored therein of the present invention's scope as it may include other effective embodiments as well.

Figure 12:
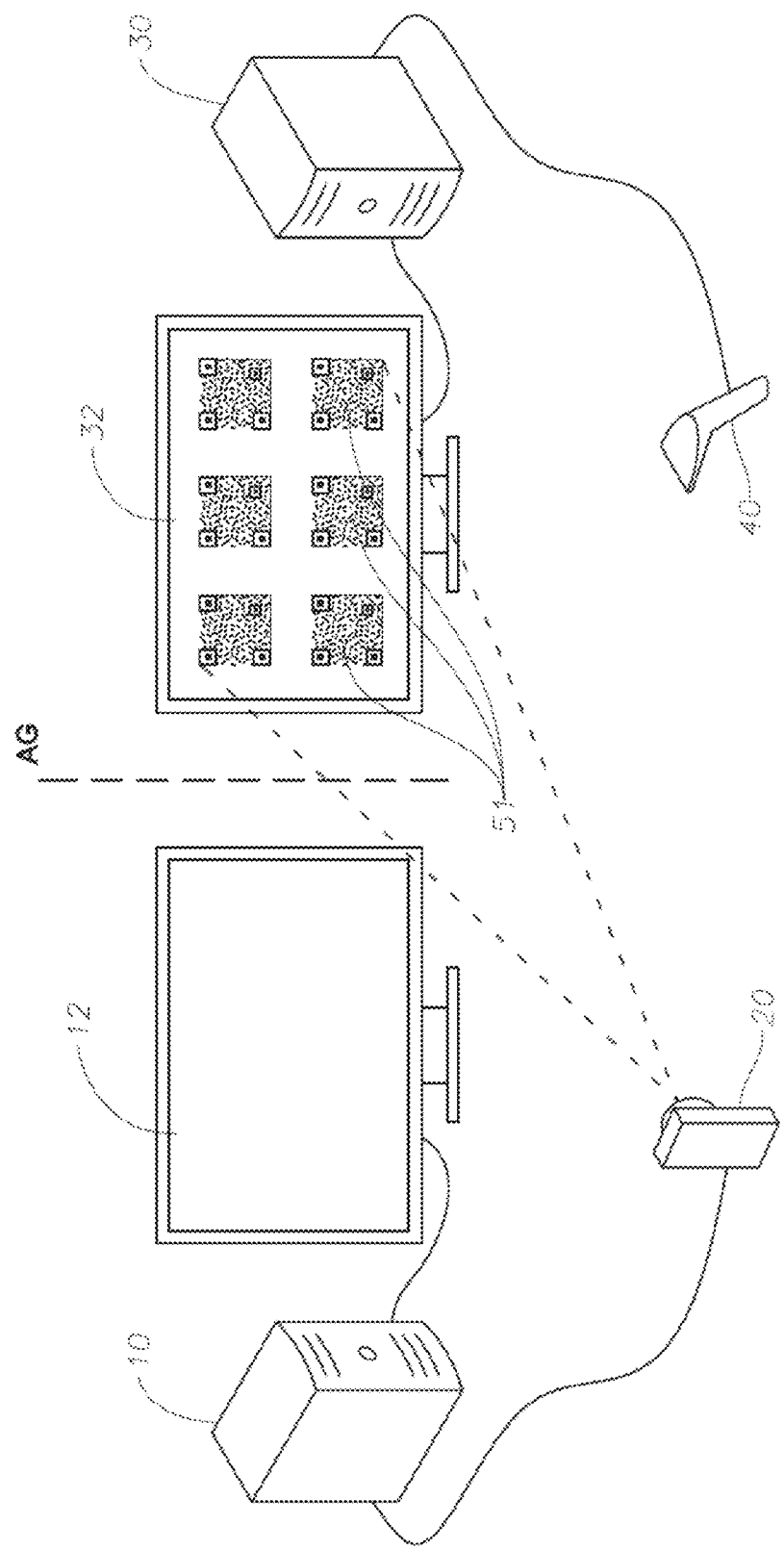
FIG. 12 is a schematic diagram of a system to transfer data between two or more networks configured to have different levels of network protection according to an embodiment of the invention.
Figure 13:
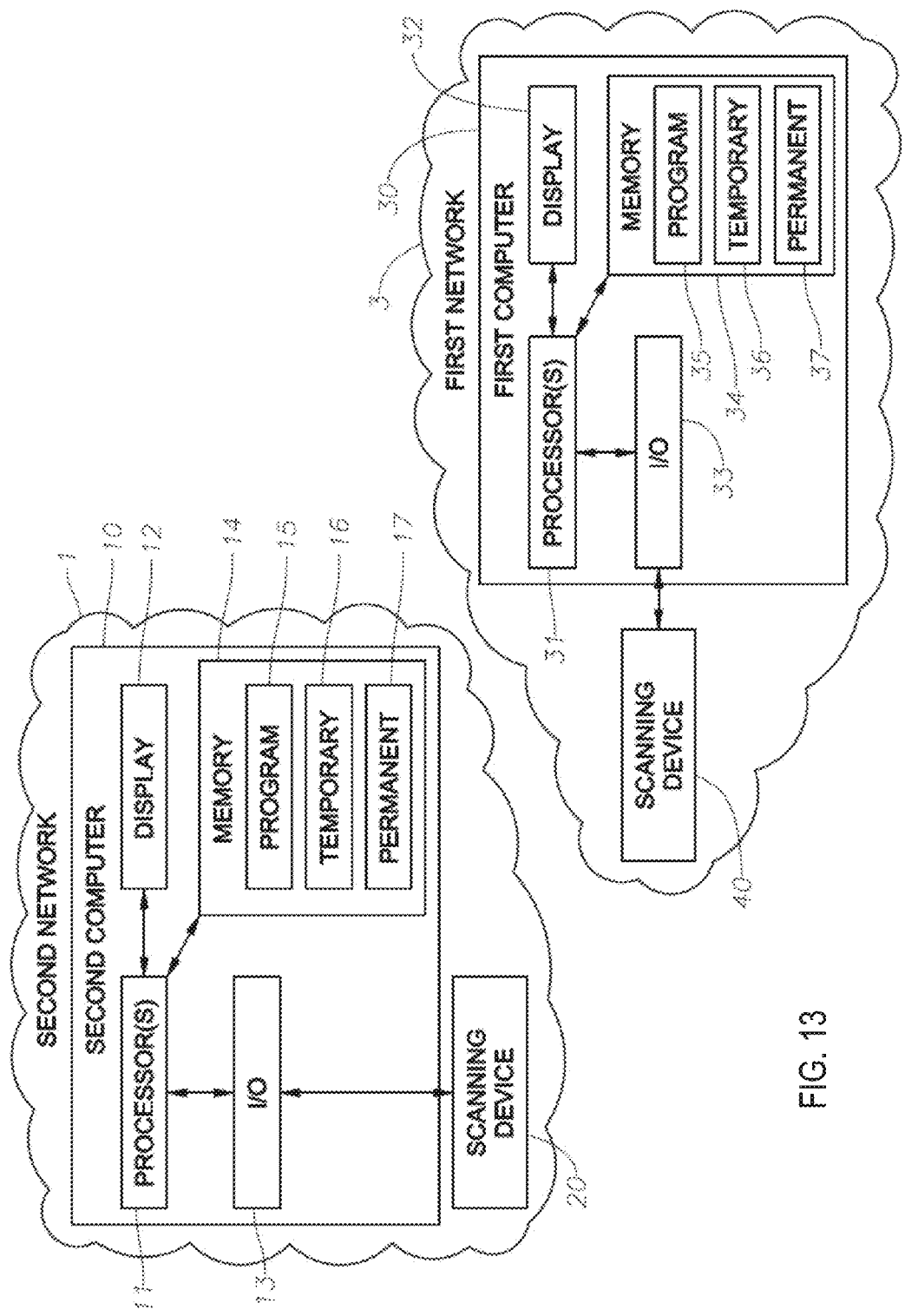
FIG. 13 is a schematic diagram of a system to transfer data between two or more networks configured to have different levels of network protection according to an embodiment of the invention.

A computer-implemented method to transfer data between two or more networks configured to have different levels of network protection, according to an embodiment of the invention, for example, can include partitioning each of one or more relatively large data backup files into a set of two or more relatively smaller partitioned files. A determination of when and how to partition can relate, in some instances, to the size or type of data backup file, for example. The two or more relatively smaller partitioned files of each of the one or more relatively large data backup files can collectively define a plurality of partitioned files, for example. Further, the one or more relatively large data backup files can be associated with and positioned within a first network 3, as illustrated in FIG. 13, for example. As a result, the plurality of partitioned files can also be associated with and positioned within the first network 3. A method can also include decoding a plurality of data barcodes 51, as illustrated in FIG. 12, for example. Each of the plurality of data barcodes 51 can be indicative of contents of one of the plurality of partitioned files. That is, each of the plurality of data barcodes 51 can be configured to encode contents of one of the plurality of partitioned files. Consequently, decoding the plurality of data barcodes 51 can produce contents of the plurality of partitioned files represented by the plurality of data barcodes 51. Decoding the plurality of data barcodes 51 can be responsive to receipt of a scan of a display 32 of a first computer 30 in communication with and positioned within the first network 3. The scan of the display 32 of the first computer 30 can be by use of one or more barcode scanning devices 20 in communication with a second computer 10. Further, the second computer 10 can be positioned remote from the first computer 30 and in communication with and positioned within a second network 1. The second network 1, in turn, can be configured to have a different level of network security protection than the first network 3. The second network 1 can also be configured to allow only one-way secure communication from the second network 1 to the first network 3.

A method can also include decoding a plurality of validation barcodes 53 indicative contents of one or more validation files. That is, the plurality of barcodes 53 can be configured to encode contents of the one or more validation files, for example. Decoding the plurality of validation barcodes 53 can thus produce contents of the one or more validation files represented by the plurality of validation barcodes 53. The one or more validation files can be configured to include decoded contents of the plurality of partitioned files. Decoding the plurality of validation barcodes 53 can also be responsive to receipt of a scan of a display 12 of the second computer 10 by use of a different one or more barcode scanning devices 40 in communication with the first computer 30. As a result, decoding the plurality of validation barcodes 53 can thereby securely communicate decoded contents of the plurality of partitioned files in one-way communication from temporary storage associated with the second network 1 to the first network 3, e.g., for comparison to contents of the plurality of partitioned files from the first network 3. For example, securely communicating decoded contents of the plurality of partitioned files in one-way communication from the temporary storage associated with the second network 1 to the first network 3 by use of the plurality of validation barcodes 53 can thereby allow comparison to contents of each of the plurality of partitioned files positioned within the first network 3 to determine whether one or more transmission errors exist in decoded contents of the plurality of partitioned files. Further, temporary storage associated with the second network 1 can include, for example, temporary storage 16 of the second computer 10, as illustrated, for example, in FIG. 13.

A method can further include decoding one or more verification barcodes 52 indicative of contents of one or more verification files. That is, the one or more verification barcodes 52 can be configured to encode contents of the one or more verification files, for example. Additionally, the one or more verification files can be configured to indicate whether successful transmission of contents of each of the plurality of partitioned files from the first network 3 to the second network 1 has occurred. For example, successful transmission of contents of each of the plurality of partitioned files from the first network 3 to the second network 1 can occur, for example, when the securely communicated decoded contents of each of the plurality of partitioned files match contents of one of the plurality of partitioned files positioned in the first network 3 and when contents of each of the plurality of partitioned files positioned in the first network 3 match the securely communicated decoded contents of one of the plurality of partitioned files. Decoding the one or more verification barcodes 52 can thus produce contents of the one or more verification files represented by the one or more verification barcodes 52. Decoding the one or more verification barcodes 52 can further be responsive to receipt of a scan of the display 32 of the first computer 30 by use of the one or more barcode scanning devices 20 in communication with the second computer 10.

A method can still further include merging decoded contents of each set of two or more relatively smaller partitioned files into a reassemblage of the respective one of the one or more relatively large data backup files, responsive to an indication from decoded contents of the one or more verification files of successful transmission of contents of each of the plurality of partitioned files from the first network 3 to the second network 1. A method can then include storing each reassemblage of the one or more relatively large data backup files in more permanent storage associated with the second network 1, responsive to an indication from decoded contents of the one or more verification files of successful transmission of contents of each of the plurality of partitioned files from the first network 3 to the second network 1. More permanent storage associated with the second network 1 can include, for example, permanent storage 17 of the second computer 10, as illustrated, for example, in FIG. 13.

Figure 9:
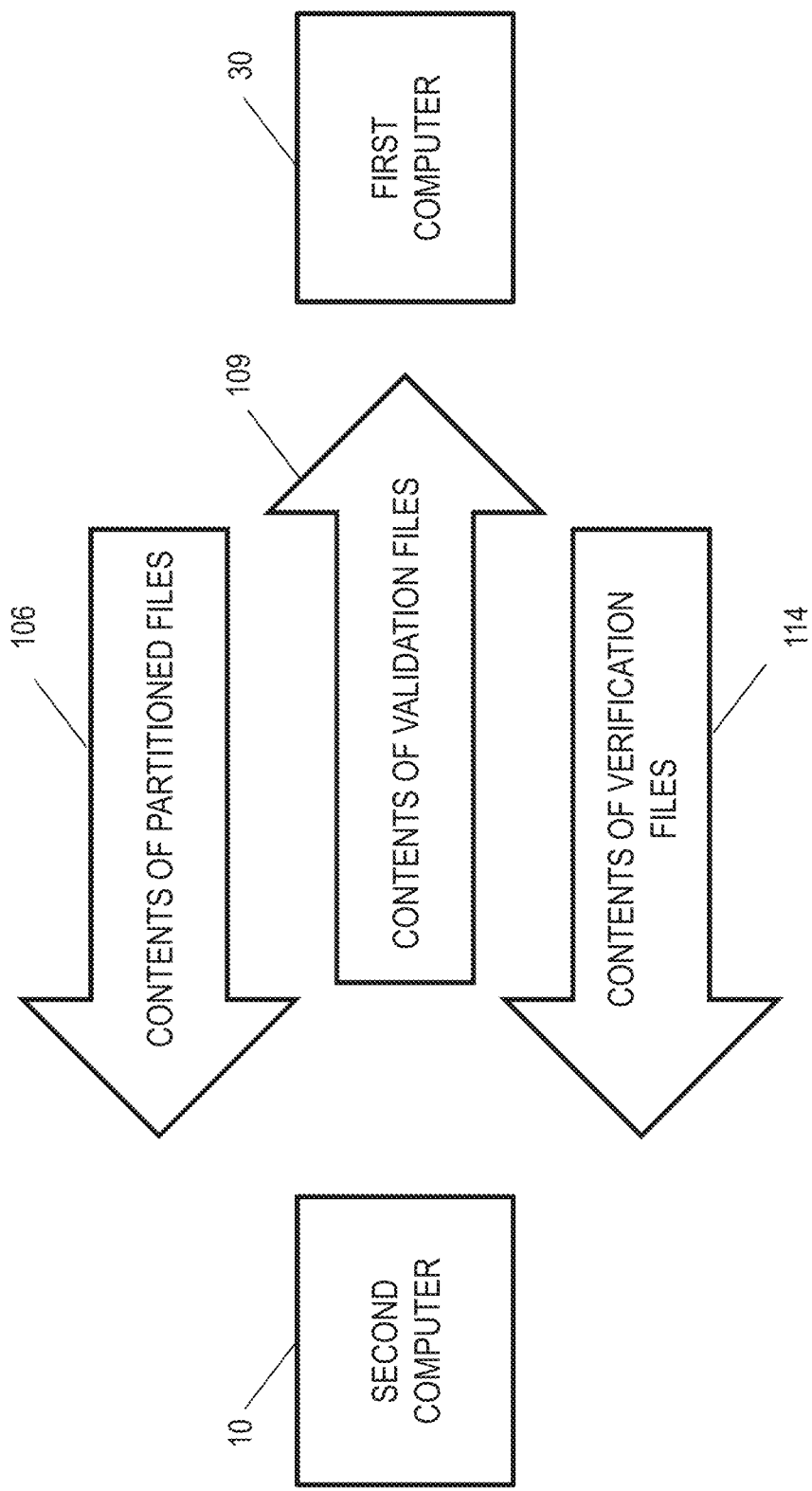
FIG. 9 is a schematic method flow diagram of a method to transfer data between two or more networks configured to have different levels of network protection according to an embodiment of the invention.

An exchange of information between the first computer 30 and the second computer 10 can thus include transmission of contents of the partitioned files 106 encoded in data barcodes 51 from the first computer 30 to the second computer 10, transmission of contents of the validation files (including decoded contents of the partitioned files) 109 from the second computer 10 to the first computer 30, and transmission of contents of the verification files 114 from the first computer 30 to the second computer 10, as illustrated, for example, in FIG. 9.

In some instances, the plurality of partitioned files can be individually separate from one another. Further, each of the one or more relatively large data backup files can include more than 1 MB of data, and each reassemblage of the one or more relatively large data backup files can include a copy of the respective one of the one or more relatively large data backup files. For example, a 3 MB data backup file could be partitioned into four smaller files, for example, contents of each of which can then be encoded in a data barcode 51. Additionally, each barcode of the plurality of data barcodes 51, the plurality of validation barcodes 53, and the one or more verification barcodes 52 can be distinct from other barcodes of the plurality of data barcodes 51, the plurality of validation barcodes 53, and the one or more verification barcodes 52.

Further, a method can include additional steps. For example, a method can also include transferring decoded contents of the plurality of partitioned files to the temporary storage associated with the second network 1 after decoding the plurality of data barcodes 51. A method can also include storing decoded contents of the plurality of partitioned files in the one or more validation files in the temporary storage associated with the second network 1 after decoding the plurality of data barcodes 51. In addition, a method can include—after decoding the plurality of validation barcodes 53—transferring decoded contents of the one or more validation files to temporary storage associated with the first network 3. For example, storage associated with the first network 3 can include temporary storage 36 or permanent storage 37 of the first computer 30, as illustrated in FIG. 13. Consequently, temporary storage associated with the first network 3 can include temporary storage 36, for example. Transferring decoded contents of the one or more validation files can thereby transfer decoded contents of the plurality of partitioned files to the first network 3 for comparison to contents of the plurality of partitioned files. In some circumstances, a method can further include generating the plurality of data barcodes 51 on the display 32 of the first computer 30, for example, as well as generating the plurality of validation barcodes 53 on the display 12 of the second computer 10. A method can also include generating the one or more verification barcodes 52 on the display 32 of the first computer 30, responsive to a comparison of (1) the securely communicated decoded contents of the plurality of partitioned files and (2) contents of the plurality of partitioned files positioned in the first network 3. A method can still further include discarding decoded contents of the plurality of partitioned files in the temporary storage associated with the second network 1. Discarding decoded contents of the plurality of partitioned files in the temporary storage associated with the second network 1 can be responsive to an indication—from decoded contents of the one or more verification files—of unsuccessful transmission of contents of each of the plurality of partitioned files from the first network 3 to the second network 1.

In some instances, the plurality of data barcodes 51 can be physically positioned separate from one another when generated on the display 32 of the first computer 30. Likewise, the plurality of validation barcodes 53 can be physically positioned separate from one another when generated on the display 12 of the second computer 10, and the one or more verification barcodes 52 can be physically positioned separate from one another when generated on the display 32 of the first computer 30. In addition, the plurality of data barcodes 51 can be distinct from the plurality of validation barcodes 53 and the one or more verification barcodes 52, and the plurality of validation barcodes 53 can be distinct from the plurality of data barcodes 51 and the one or more verification barcodes 52.

In some circumstances, the first network 3 can include a high-security network, and the second network 1 can include a low-security network. Conversely, in other circumstances, the first network 3 can include a low-security network, and the second network 1 can include a high-security network. Further, in some instances, decoding the plurality of data barcodes 51 can include disregarding error-correction capabilities of the plurality of data barcodes 51.

Figure 10B:
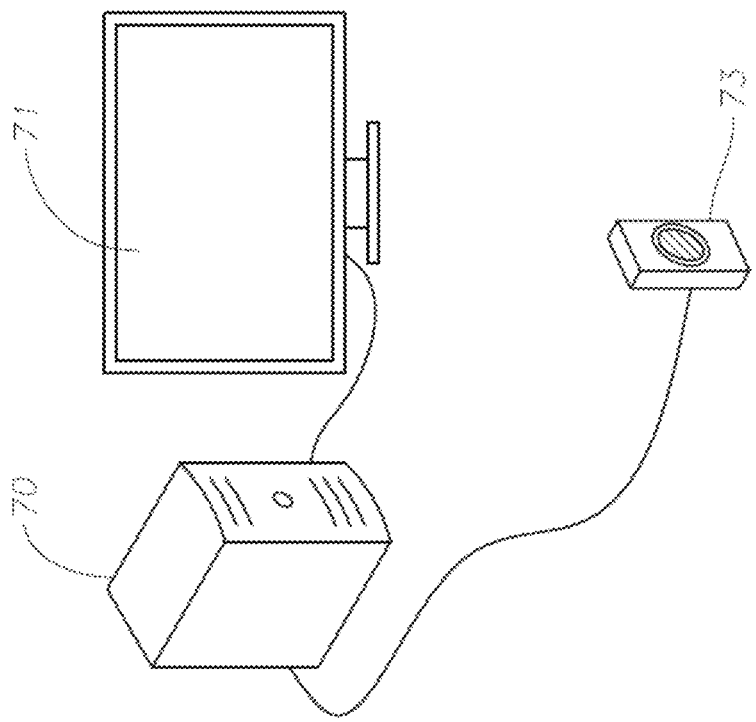
FIG. 10b is a schematic diagram of some of the elements of a system to transfer data between two or more networks configured to have different levels of network protection according to an embodiment of the invention.
Figure 10A:
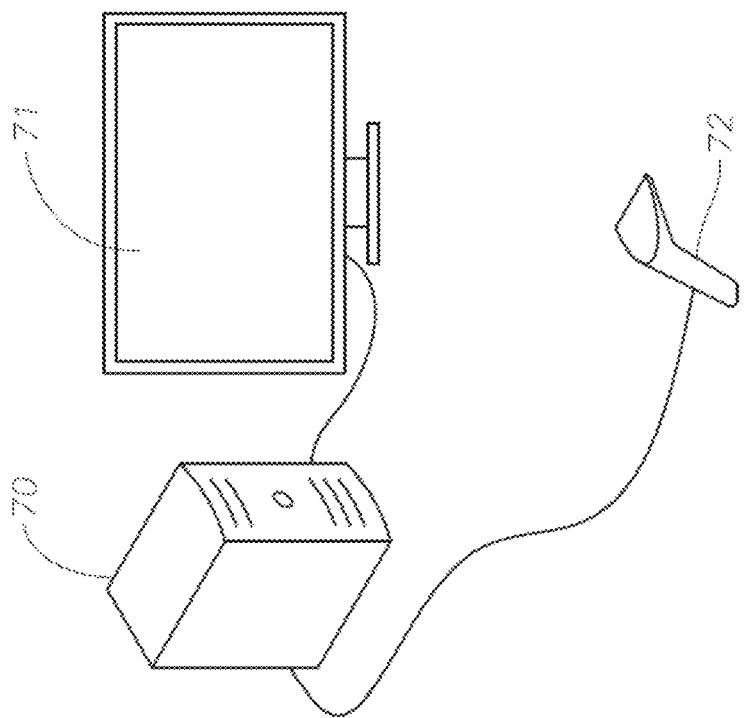
FIG. 10a is a schematic diagram of some of the elements of a system to transfer data between two or more networks configured to have different levels of network protection according to an embodiment of the invention.

Barcodes and a barcode scanning device can include additional distinctive features. For example, in some cases, the plurality of data barcodes 51, the plurality of validation barcodes 53, and the one or more verification barcodes 52 can include one or more of the following, as will be understood by those skilled in the art: two-dimensional matrix codes, QR Codes, Aztec Codes, and PDF417 codes. In addition, the one or more barcode scanning devices 20 in communication with the second computer 10 can be configured to scan a plurality of barcodes simultaneously, and the one or more barcode scanning devices 40 in communication with the first computer 30 can be configured to scan a plurality of barcodes simultaneously. For example, a barcode scanning device, such as a barcode scanning device 20 or a barcode scanning device 40, can include one or more of the following, as will be understood by those skilled in the art: a barcode reading device 72, a QR Code reading device, a field-of-view barcode reading device 73, and a camera, as illustrated, for example, in FIG. 10a and FIG. 10b. In FIG. 10a, for example, a computer 70 is depicted as connected to a display 71 and a barcode reading device 72. Similarly, in FIG. 10b, for example, a computer 70 is depicted as connected to a field-of-view barcode reading device 73, in addition to a display 71.

Figure 8:
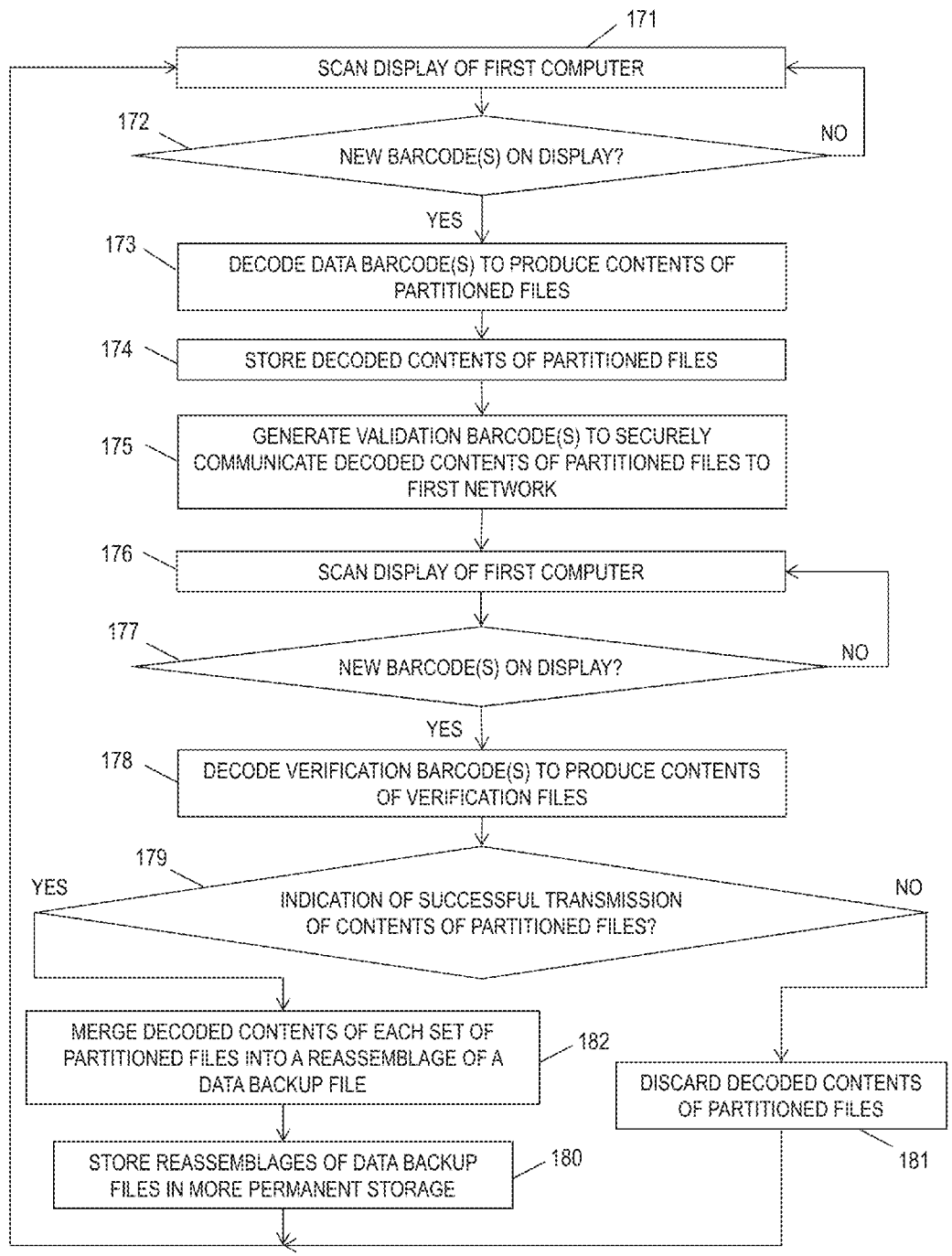
FIG. 8 is a schematic method flow diagram of a method to transfer data between two or more networks configured to have different levels of network protection according to an embodiment of the invention.

In some circumstances, a method can include steps performed by the second computer 10. For example, after scanning 171 a display 32 of the first computer 30, a method can include determining 172 whether one or more new data barcodes 51 are on the display 32, as illustrated, for example, in FIG. 8. If the display 32 does not depict any new data barcodes 51, a method can include scanning 171 the display 32 again. If the display 32 depicts one or more new data barcodes 51, a method can include decoding 173 the plurality of data barcodes 51 to produce contents of the plurality of partitioned files. A method can then include storing 174 decoded contents of the plurality of partitioned files. A method can further include generating 175 a plurality of validation barcodes 53 on a display 12 of the second computer 10 to securely communicate decoded contents of the plurality of partitioned files to the first network 3. A method can still further include scanning 176 a display 32 of the first computer 30 then determining 177 whether one or more new verification barcodes 52 are on the display 32. If the display 32 does not depict any new verification barcodes 52, a method can include scanning 176 the display 32 again. If the display 32 depicts one or more new verification barcodes 52, a method can include decoding 178 the one or more verification barcodes 52 to produce contents of one or more verification files. A method can then include determining 179 whether decoded contents of the one or more verification files indicate a successful transmission of contents of the plurality of partitioned files from the first network 3 to the second network 1. If successful transmission is indicated, a method can include merging 182 decoded contents of each set of two or more partitioned files into a reassemblage of each of the data backup files and storing 180 the reassemblages of the data backup files in more permanent storage. A method can then include scanning 171 a display 32 of the first computer 30 in anticipation of transmission of additional contents of partitioned files encoded in data barcodes 51. If unsuccessful transmission is indicated, a method can include discarding 181 decoded contents of the plurality of partitioned files then scanning 171 a display 32 of the first computer 30 in anticipation of transmission of additional contents of partitioned files encoded in data barcodes 51.

Figure 11:
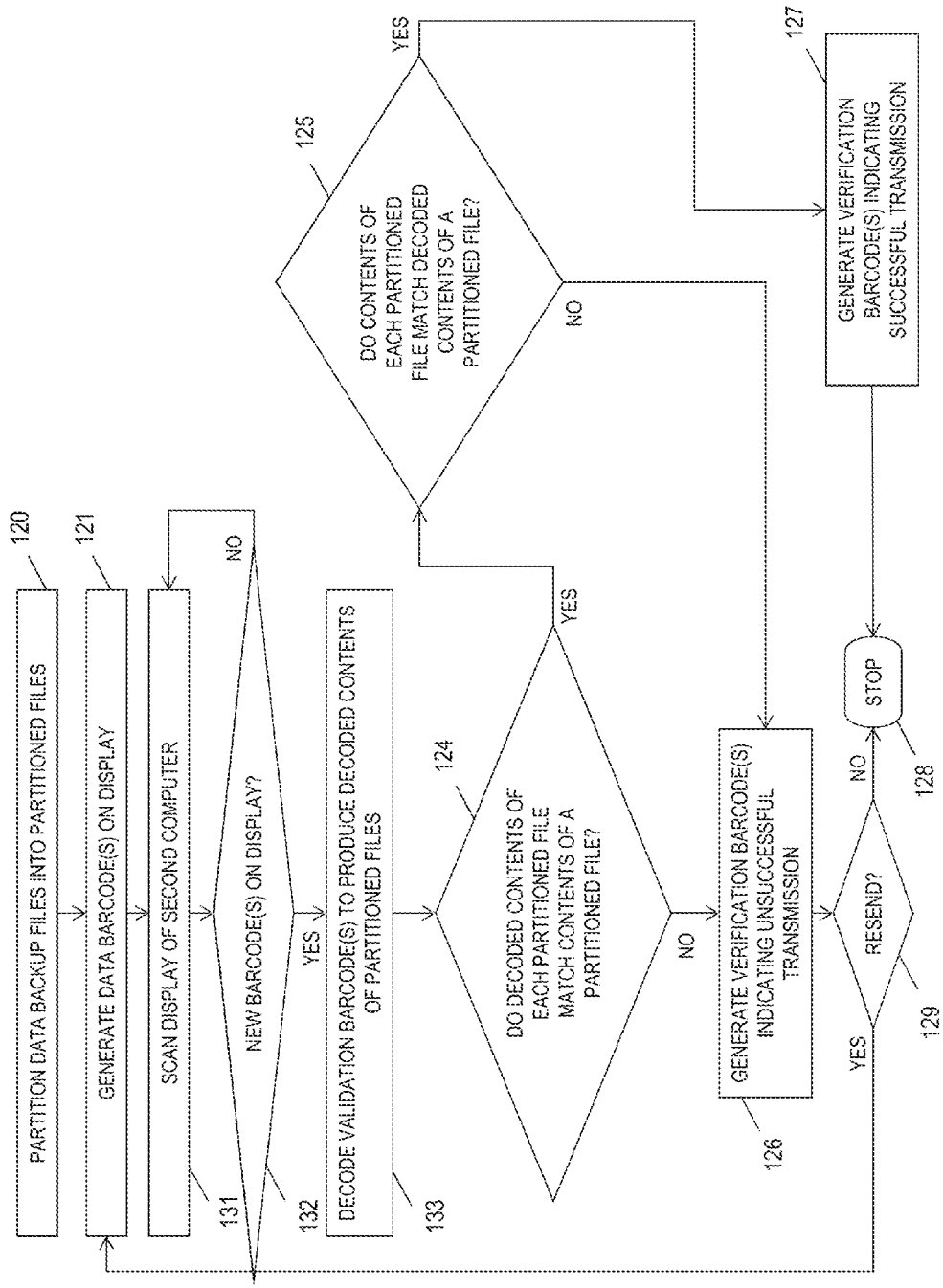
FIG. 11 is a schematic method flow diagram of a method to transfer data between two or more networks configured to have different levels of network protection according to an embodiment of the invention.

Similarly, a method can in some circumstances include steps performed by the first computer 30. For example, as illustrated in FIG. 11, a method can include partitioning 120 each of one or more data backup files into a set of two or more partitioned files then generating 121 a plurality of data barcodes 51 on a display 32 of the first computer 30. After generating 121 the plurality of data barcodes 51, a method can include scanning 131 a display 12 of the second computer 10 then determining 132 whether new validation barcodes 53 are depicted on the display 12. If new validation barcodes 53 are not depicted on the display 12, a method can include scanning 131 a display 12 of the second computer 10 again. If new validation barcodes 53 are depicted on the display 12, a method can include decoding 133 the validation barcodes 53 to produce contents of the validation files, i.e., decoded contents of the plurality of partitioned files. A method can then include determining 124 whether securely communicated decoded contents of each partitioned file match contents of a partitioned file positioned in the first network 3. If so, a method can then include determining 125 whether contents of each partitioned file positioned in the first network 3 match securely communicated decoded contents of a partitioned file. If contents of each partitioned file match securely communicated decoded contents of a partitioned file—i.e., if step 125 is determined to be "yes"—a method can include generating 127 one or more verification barcodes 52 indicating successful transmission of contents of the plurality of partitioned files from the first network 3 to the second network 1 then stopping 128. If not all securely communicated decoded contents of each partitioned file match contents of a partitioned file positioned in the first network 3—that is, if step 124 is determined to be "no"—or if not all contents of each partitioned file match securely communicated decoded contents of a partitioned file—that is, if step 125 is determined to be "no"—a method can include generating 126 one or more verification barcodes 52 indicating unsuccessful transmission of contents of the plurality of partitioned files from the first network 3 to the second network 1. A method can then include determining 129 whether to resend contents of the plurality of partitioned files. If contents of the plurality of partitioned files are not to be resent, a method can stop 128. If contents of the plurality of partitioned files are to be resent, a method can include again generating 121 data barcodes 51 on a display 32 of the first computer 30.

An embodiment can also include systems to transfer data between two or more networks configured to have different levels of network protection. For example, a system can include a first computer 30 and a second computer 10, as illustrated in FIG. 13, for example. The first computer 30 can be in communication with and positioned within a first network 3, and the second computer 10 can be positioned remote from the first computer 30 and in communication with and positioned within a second network 1. The first computer 30, for example, can include one or more processors 31 and one or more barcode scanning devices 40 in communication with the one or more processors 31. The first computer 30 can also include one or more displays 32 in communication with the one or more processors 31 and non-transitory memory medium 34 in communication with the one or more processors 31. For example, the first computer 30 can be a hardened server. In some instances, the first computer 30 can still further include one or more input and output unit 33 in communication with the one or more processors 31. The memory medium 34 can include computer-readable instructions stored therein that when executed cause the first computer 30 to perform steps. The computer-readable instructions can include, for example, a computer program 35, as illustrated in FIG. 13, for example. The memory medium 34 can also include temporary storage 36 and permanent storage 37. The steps performed by the first computer can include, for example, partitioning each of one or more relatively large data backup files into a set of two or more relatively smaller partitioned files. The two or more relatively smaller partitioned files of each of the one or more relatively large data backup files can collectively define a plurality of partitioned files. Additionally, the one or more relatively large data backup files can be associated with and positioned within the first network 3. The steps can also include decoding a plurality of validation barcodes 53 indicative of contents of one or more validation files. That is, the plurality of validation barcodes 53 can be configured to encode contents of the one or more validation files. Decoding the plurality of validation barcodes 53 can be responsive to receipt of a scan of one or more of one or more displays 12 of the second computer 10 by use of the one or more barcode scanning devices 40 of the first computer 30. Further, decoding the plurality of validation barcodes 53 can produce contents of the one or more validation files represented by the plurality of validation barcodes 53.

The second network 1 can be configured to have temporary storage and separate more permanent storage associated therewith. For example, temporary storage associated with the second network 1 can include temporary storage 16 of the second computer 10, for example, as illustrated in FIG. 13. More permanent storage associated with the second network 1 can include permanent storage 17 of the second computer 10, for example. In addition, the second network 1 can be further configured to have a different level of network security protection than the first network 3 and to allow only one-way secure communication from the second network 1 to the first network 3. The second computer 10, for example, can include one or more processors 11 and one or more input and output units 13 in communication with the one or more processors 11 of the second computer 10. The second computer 10 can further include one or more displays 12 in communication the one or more processors 11 of the second computer 10 and another different one or more barcode scanning devices 20 in communication with the one or more processors 11 of the second computer 10. Additionally, the second computer 10 can include non-transitory memory medium 14 in communication with the one or more processors 11 of the second computer 10. For example, non-transitory computer-readable medium can be memory 14 of the second computer 10 having one or more computer programs 15 stored therein, as illustrated in FIG. 13, for example. The memory medium 14 of the second computer 10 can include computer-readable instructions stored therein that when executed cause the second computer 10 to perform a series of steps. For example, the steps can include decoding a plurality of data barcodes 51 each indicative of contents of one of the plurality of partitioned files. Decoding the plurality of data barcodes 51 can thus produce contents of the plurality of partitioned files represented by the plurality of data barcodes 51. Decoding the plurality of data barcodes 51 can further be responsive to receipt of a scan of one or more of the one or more displays 32 of the first computer 30 by use of the one or more barcode scanning devices 20 of the second computer 10. The steps can also include generating the plurality of validation barcodes 53 on one or more of the one or more displays 12 of the second computer 10. The one or more validation files can be configured to include decoded contents of the plurality of partitioned files. As a result, generating the plurality of validation barcodes 53 can thereby securely communicate decoded contents of the plurality of partitioned files in one-way communication from the temporary storage associated with the second network 1 to the first network 3, for example, for comparison to contents of the plurality of partitioned files positioned within the first network 3. The steps can further include decoding one or more verification barcodes 52 indicative of contents of one or more verification files. That is, the one or more verification barcodes 52 can be configured to encode the one or more verification files. Further, the one or more verification files can be configured to indicate whether successful transmission of contents of each of the plurality of partitioned files from the first network 3 to the second network 1 has occurred. Decoding the one or more verification barcodes 52 can be responsive to receipt of a scan of one or more of the one or more displays 32 of the first computer 30 by use of the one or more barcode scanning devices 20 of the second computer 10. The steps can then include merging decoded contents of each set of two or more relatively smaller partitioned files into a reassemblage of the respective one of the one or more relatively large data backup files responsive to an indication from decoded contents of the one or more verification files of successful transmission of contents of each of the plurality of partitioned files from the first network 3 to the second network 1. The steps can still further include storing each reassemblage of the one or more relatively large data backup files in the more permanent storage associated with the second network 1, responsive to an indication from decoded contents of the one or more verification files of successful transmission of contents of each of the plurality of partitioned files from the first network 3 to the second network 1.

For example, securely communicating decoded contents of the plurality of partitioned files in one-way communication from the temporary storage associated with the second network 1 to the first network 3 by use of the plurality of validation barcodes 53 can thereby allow comparison to contents of each of the plurality of partitioned files positioned within the first network 3 to determine whether one or more transmission errors exist in decoded contents of the plurality of partitioned files. Additionally, the plurality of partitioned files can be individually separate from one another, and each of the one or more relatively large data backup files can include more than 1 MB of data. Further, each reassemblage of the one or more relatively large data backup files can include a copy of the respective one of the one or more relatively large data backup files. In addition, each barcode of the plurality of data barcodes 51, the plurality of validation barcodes 53, and the one or more verification barcodes 52 can be distinct from other barcodes of the plurality of data barcodes 51, the plurality of validation barcodes 53, and the one or more verification barcodes 52.

In some circumstances, the memory medium 34 of the first computer 30 can also include computer-readable instructions stored therein that when executed cause the first computer 30 to perform additional steps, such as generating the plurality of data barcodes 51 on one or more of the one or more displays 32 of the first computer 30. Additional steps performed by the first computer 30 can also include transferring decoded contents of the one or more validation files to temporary storage associated with the first network 3 after decoding the plurality of validation barcodes 53. Transferring decoded contents of the one or more validation files can thereby transfer decoded contents of the plurality of partitioned files to the first network 3 for comparison to contents of the plurality of partitioned files. Other steps performed by the first computer 30 can also include generating the one or more verification barcodes 52 on one or more of the one or more displays 32 of the first computer 30, responsive to a comparison of (1) the securely communicated decoded contents of the plurality of partitioned files and (2) contents of the plurality of partitioned files positioned in the first network 3.

Similarly, the memory medium 14 of the second computer 10 can further include computer-readable instructions stored therein that when executed cause the second computer 10 to perform additional steps. Additional steps performed by the second computer 10 can include, for example, transferring decoded contents of the plurality of partitioned files to the temporary storage associated with the second network 1 after decoding the plurality of data barcodes 51, as well as storing decoded contents of the plurality of partitioned files in the one or more validation files in the temporary storage associated with the second network 1 after decoding the plurality of data barcodes 51. Other steps performed by the second computer 10 can also include discarding decoded contents of the plurality of partitioned files in the temporary storage associated with the second network 1, responsive to an indication from decoded contents of the one or more verification files of unsuccessful transmission of contents of each of the plurality of partitioned files from the first network 3 to the second network 1.

In addition, the one or more barcode scanning devices 20 of the second computer 10 can be configured to scan a plurality of barcodes simultaneously, and the one or more barcode scanning devices 40 of the first computer 30 can also be configured to scan a plurality of barcodes simultaneously. Further, the plurality of data barcodes 51 can be physically positioned separate from one another when generated on the one or more of the one or more displays 32 of the first computer 30. Similarly, the plurality of validation barcodes 53 can be physically positioned separate from one another when generated on the one or more of the one or more displays 12 of the second computer 10, and the one or more verification barcodes 52 can be physically positioned separate from one another when generated on the one or more of the one or more displays 32 of the first computer 30. Further, successful transmission of contents of each of the plurality of partitioned files from the first network 3 to the second network 1 can occur when the securely communicated decoded contents of each of the plurality of partitioned files match contents of one of the plurality of partitioned files positioned in the first network 3 and when contents of each of the plurality of partitioned files positioned in the first network 3 match the securely communicated decoded contents of one of the plurality of partitioned files. In some instances, the plurality of data barcodes 51 can be distinct from the plurality of validation barcodes 53 and the one or more verification barcodes 52, and the plurality of validation barcodes 53 can be distinct from the plurality of data barcodes 51 and the one or more verification barcodes 52.

In some circumstances, the first network 3 can include a high-security network, and the second network 1 can include a low-security network. In other circumstances, the first network 3 can include a low-security network, and the second network 1 can include a high-security network. Decoding the plurality of data barcodes 51, in some instances, can include disregarding error-correction capabilities of the plurality of data barcodes 51. Further, the plurality of data barcodes 51, the plurality of validation barcodes 53, and the one or more verification barcodes 52 can include one or more of the following: two-dimensional matrix codes, QR Codes, Aztec Codes, and PDF417 codes. A barcode scanning device can also include one or more of the following: a barcode reading device 72, a QR Code reading device, a field-of-view barcode reading device 73, and a camera, for example.

An embodiment of the invention can additionally include non-transitory computer-readable medium having one or more computer programs stored therein operable by one or more processors to transfer data between two or more networks configured to have different levels of network protection. The one or more computer programs, for example, can include a set of instructions that, when executed by the one or more processors, cause the one or more processors to perform operations. Those operations can include partitioning each of one or more relatively large data backup files into a set of two or more relatively smaller partitioned files. The two or more relatively smaller partitioned files of each of the one or more relatively large data backup files can collectively define a plurality of partitioned files, for example. Further, the one or more relatively large data backup files can be associated with and positioned within a first network 3. The operations can also include decoding a plurality of data barcodes 51 each indicative of contents of one of the plurality of partitioned files. Decoding the plurality of data barcodes 51 can be responsive to receipt of a scan of a display 32 of a first computer 30 in communication with and positioned within the first network 3. A scan of the display 32 of the first computer 30 can be by use of one or more barcode scanning devices 20 in communication with a second computer 10. The second computer 10 can be positioned remote from the first computer 30 and in communication with and positioned within a second network 1. Further, the second network 1 can be configured to have a different level of network security protection than the first network 3 and further configured to allow only one-way secure communication from the second network 3 to the first network 1. Decoding the plurality of data barcodes 51 can thus produce contents of the plurality of partitioned files represented by the plurality of data barcodes 51.

The operations can further include decoding a plurality of validation barcodes 53 indicative of contents of one or more validation files. Decoding the plurality of validation barcodes 53 can thus produce contents of the one or more validation files represented by the plurality of validation barcodes 53. The one or more validation files can be configured to include decoded contents of the plurality of partitioned files. Decoding the plurality of validation barcodes 53 can be responsive to receipt of a scan of a display 12 of the second computer 10. A scan of the display 12 of the second computer 10 can be by use of a different one or more barcode scanning devices 40 in communication with the first computer 30, for example. Consequently, decoding the plurality of validation barcodes 53 can thereby securely communicate decoded contents of the plurality of partitioned files in one-way communication from temporary storage associated with the second network 1 to the first network 3, e.g., for comparison to contents of the plurality of partitioned files positioned within the first network 3.

The operations can also include decoding one or more verification barcodes 52 indicative of contents of one or more verification files. Decoding the one or more verification barcodes 52 can thus produce contents of the one or more verification files represented by the one or more verification barcodes 52. Further, the one or more verification files can be configured to indicate whether successful transmission of contents of each of the plurality of partitioned files from the first network 3 to the second network 1 has occurred. Decoding the one or more verification barcodes 52 can be responsive to receipt of a scan of the display 32 of the first computer 30 by use of the one or more barcode scanning devices 20 in communication with the second computer 10. The operations can then include merging decoded contents of each set of two or more relatively smaller partitioned files into a reassemblage of the respective one of the one or more relatively large data backup files responsive to an indication from decoded contents of the one or more verification files of successful transmission of contents of each of the plurality of partitioned files from the first network 3 to the second network 1. The operations can further include storing each reassemblage of the one or more relatively large data backup files in more permanent storage associated with the second network 1, responsive to an indication from decoded contents of the one or more verification files of successful transmission of contents of each of the plurality of partitioned files from the first network 3 to the second network 1.

For example, securely communicating decoded contents of the plurality of partitioned files in one-way communication from the temporary storage associated with the second network 1 to the first network 3 by use of the plurality of validation barcodes 53 can thereby allow comparison to contents of each of the plurality of partitioned files positioned within the first network 3 to determine whether one or more transmission errors exist in decoded contents of the plurality of partitioned files. In some circumstances, the plurality of partitioned files can be individually separate from one another, and each of the one or more relatively large data backup files can include more than 1 MB of data. Further, each reassemblage of the one or more relatively large data backup files can include a copy of the respective one of the one or more relatively large data backup files. In addition, each barcode of the plurality of data barcodes 51, the plurality of validation barcodes 53, and the one or more verification barcodes 52 can be distinct from other barcodes of the plurality of data barcodes 51, the plurality of validation barcodes 53, and the one or more verification barcodes 52.

The operations can further include generating the plurality of data barcodes 51 on the display 32 of the first computer 30, in some circumstances. Further, the operations can include transferring decoded contents of the plurality of partitioned files to the temporary storage associated with the second network 1 after decoding the plurality of data barcodes 51, as well as storing decoded contents of the plurality of partitioned files in the one or more validation files in the temporary storage associated with the second network 1 after decoding the plurality of data barcodes 51. The operations can also include generating the plurality of validation barcodes 53 on the display 12 of the second computer 10. The operations can still further include transferring decoded contents of the one or more validation files to temporary storage associated with the first network 3 after decoding the plurality of validation barcodes 53. Transferring decoded contents of the one or more validation files can thereby transfer decoded contents of the plurality of partitioned files to the first network 3 for comparison to contents of the plurality of partitioned files. In addition, the operations can include generating the one or more verification barcodes 52 on the display 32 of the first computer 30, responsive to a comparison of (1) the securely communicated decoded contents of the plurality of partitioned files and (2) contents of the plurality of partitioned files positioned in the first network 3. Furthermore, the operations can include discarding decoded contents of the plurality of partitioned files in the temporary storage associated with the second network 1, responsive to an indication from decoded contents of the one or more verification files of unsuccessful transmission of contents of each of the plurality of partitioned files from the first network 3 to the second network 1.

In some instances, successful transmission of contents of each of the plurality of partitioned files from the first network 3 to the second network 1 can occur when the securely communicated decoded contents of each of the plurality of partitioned files match contents of one of the plurality of partitioned files positioned in the first network 3 and when contents of each of the plurality of partitioned files positioned in the first network 3 match the securely communicated decoded contents of one of the plurality of partitioned files. Additionally, the one or more barcode scanning devices 20 in communication with the second computer 10 can be configured to scan a plurality of barcodes simultaneously, and the one or more barcode scanning devices 40 in communication with the first computer 30 can be configured to scan a plurality of barcodes simultaneously. Further, the plurality of data barcodes 51 can be physically positioned separate from one another when generated on the display 32 of the first computer 30. Likewise, the plurality of validation barcodes 53 can be physically positioned separate from one another when generated on the display 12 of the second computer 10, and the one or more verification barcodes 52 can be physically positioned separate from one another when generated on the display 32 of the first computer 30. In addition, the plurality of data barcodes 51 can be distinct from the plurality of validation barcodes 53 and the one or more verification barcodes 52, and the plurality of validation barcodes 53 can be distinct from the plurality of data barcodes 51 and the one or more verification barcodes 52.

In some circumstances, the first network 3 can include a high-security network, and the second network 1 can include a low-security network. In other circumstances, the first network 3 can include a low-security network, and the second network 1 can include a high-security network. Further, decoding the plurality of data barcodes 51 can include disregarding error-correction capabilities of the plurality of data barcodes 51. In some instances, the plurality of data barcodes 51, the plurality of validation barcodes 53, and the one or more verification barcodes 52 can include one or more of the following: two-dimensional matrix codes, QR Codes, Aztec Codes, and PDF417 codes. In addition, a barcode scanning device can include one or more of the following: a barcode reading device 72, a QR Code reading device, a field-of-view barcode reading device 73, and a camera.

An embodiment can advantageously enable an entity to establish an air gap between two or more networks, such as a low-security network and a high-security network. An air gap can prevent communication, such as TCP/IP, between two or more networks. Consequently, an air gap between a low-security network and a high-security network can be employed to protect the high-security network from unauthorized access through the low-security network. In particular, an embodiment can be used to transmit large files between a high-security network and a low-security network for data backup purposes while retaining the protection of an air gap, for example. Notably, an embodiment can address a particular challenge associated with data backup from a high-security network: the files to be backed up can be very large. The one or more files to be transmitted, for instance, can include one or more large files. Further, the one or more large files can include one or more data backup files. For example, regular maintenance of a high-security network can include backing up files, such as configuration or imaged data. It can be desirable, however, to back up this data to another location that is external to the high-security network for information assurance purposes. An embodiment can enable this backup data to be transmitted to the low-security network. An additional challenge associated with transmission of backup data, though, can be that the backup data frequently contains large files that are often too big to be encoded as a single barcode. An embodiment can therefore provide for large files to be broken apart, i.e., partitioned into smaller files, before being encoded as barcodes. For example, in some methods according to an embodiment, a method can include partitioning each of one or more relatively large files into a set of two or more relatively smaller partitioned files, before generating multiple data barcodes 51. The data barcodes 51 can be simultaneously generated so as to fill a display 32, for example, and can encode contents of the relatively smaller partitioned files. A method can also include, after transferring decoded contents of the relatively smaller partitioned files to temporary storage associated with the second network 1, merging decoded contents of each set of two or more relatively smaller partitioned files into a reassemblage of the respective one of the one or more relatively large files. For example, files larger than 1 MB can be partitioned. In that example, contents of files smaller than 1 MB can be encoded in barcodes without first partitioning the files into smaller files. After transferring decoded contents of the relatively smaller partitioned files to temporary storage associated with the second network 1, partitioned files can be identified and distinguished from files that were not the product of partitioning a large file, for example. If successful transmission is indicated, decoded contents of each set of two or more relatively smaller partitioned files into a reassemblage of the respective one of the files larger than 1 MB and stored along with decoded contents of files smaller than 1 MB, for example. Alternatively, in some methods according to an embodiment, a method can include merging decoded contents of each set of two or more relatively smaller partitioned files into a reassemblage of the respective one of the one or more relatively large files after decoding the plurality of data barcodes 51, i.e., without waiting for confirmation of successful transfer. In that example, storage of the reassemblages can nevertheless require confirmation of successful transfer, in some instances. Consequently, an embodiment can enable backups of data stored on a high-security network—even when the data contains large files—for information assurance purposes, for example, while protecting the high-security network from unauthorized access or intrusion.

In some circumstances, one of the networks can be a high-security network (HSN). An HSN can be a critical network such as, for example, a process automation system (PAS) network that requires maximum security measures and protections to ensure business continuity. One of the networks can also be a low-security network (LSN), such as a corporate business network (CBN). For example, a CBN can be a lower security network than a PAS network because, in the event that data from a network of an entity were to be lost, a data loss from the CBN would not affect the business or operations of the entity as significantly as a data loss from the PAS network. Rather, a data loss from the CBN would have a smaller impact on the entity's operations. An embodiment of the invention can therefore advantageously minimize the risk of a cyber-security incident by eliminating the transmission of data from an LSN to an HSN through traditional networking methods.

Figure 14A:
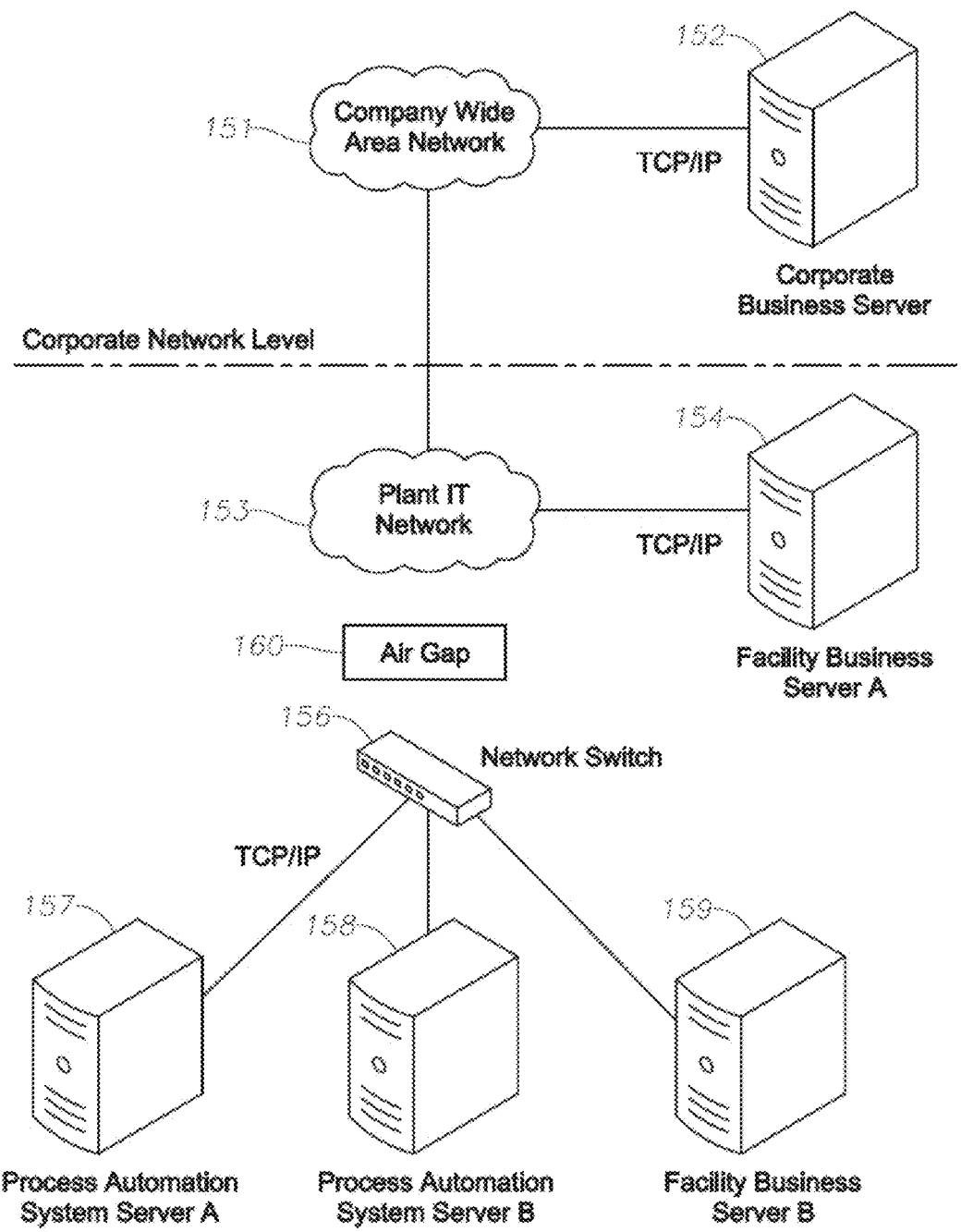
FIG. 14a is a schematic diagram of a system to transfer data between two or more networks configured to have different levels of network protection according to an embodiment of the invention.

For example, large volumes of data—such as data for backup purposes, for example—can be transferred between physically isolated networks by use of one or more barcode scanning devices in communication with each network. An embodiment can exist and operate, for instance, when two or more networks are physically isolated from one another. That is, an embodiment can introduce a new apparatus into an entity's equipment and infrastructure in which an air gap exists between two or more networks. An embodiment can relate to two or more networks that have no direct network connection between them—a perfect air gap—and permit transfer of data between the networks by use of barcodes. For example, an embodiment can exist and operate in arrangements in which an air gap 160 exists between two or more networks, as illustrated, for example, in FIG. 14a and FIG. 14b. When an air gap 160 exists, no physical connection exists between two or more networks. For example, an entity that operates a manufacturing plant can have a company wide area network 151, and a corporate business server 152 can be in communication with the company wide area network 151 at a corporate network level, e.g., via TCP/IP, as illustrated in FIG. 14a. The company wide area network 151 can be in communication with a plant IT network 153 that is located, for example, at the entity's plant facility. The plant IT network 153 can be in communication with a first facility business server A 154, for example. A first process automation server A 157, a second process automation server B 158, and a second facility business server B 159 can also be located at the plant facility but can be separated from the plant IT network 153 and first facility business server A 154 by an air gap 160, for example. Although the first process automation server A 157, the second process automation server B 158, and the second facility business server B 159 can be in communication by use of a network switch 156, for example, they can lack TCP/IP communication with the plant IT network 153 and first facility business server A 154, as depicted in FIG. 14a, for example. That is, the plant IT network 153 and company wide area network 151, as depicted, cannot communicate with the process automation system servers 157 and 158 using TCP/IP protocols. An air gap 160 can be desirable to ensure that process automation system data, for example, is not subject to unauthorized access or intrusion through the plant IT network 153 or company wide area network 151.

In such an arrangement, the entity can wish to maintain the air gap 160 but nevertheless allow some communication between the process automation servers 157 and 158 and the plant IT network 153, for example. For instance, the entity can wish to transmit customer order information from the plant IT network 153 to the process automation servers 157 and 158 so as to enable the process automation servers 157 and 158 to perform some tasks to fulfill the customer order. In that instance, the entity would like to be able to transmit information securely from the plant IT network 153 to the process automation servers 157 and 158. In addition, the entity can wish to back up data or otherwise transmit digitally stored information, such as database records or backup data files, stored in facility business server B 159, to facility business server A 154—in communication with the plant IT network 153 and on the other side of the air gap 160—for information assurance purposes. In that instance, the entity would like to be able to transmit information securely from facility business server B 159 to facility business server A 154 while maintaining the air gap 160. An embodiment of the invention can advantageously permit these transmissions while still protecting high-security networks, such as a process automation system network.

Figure 3:
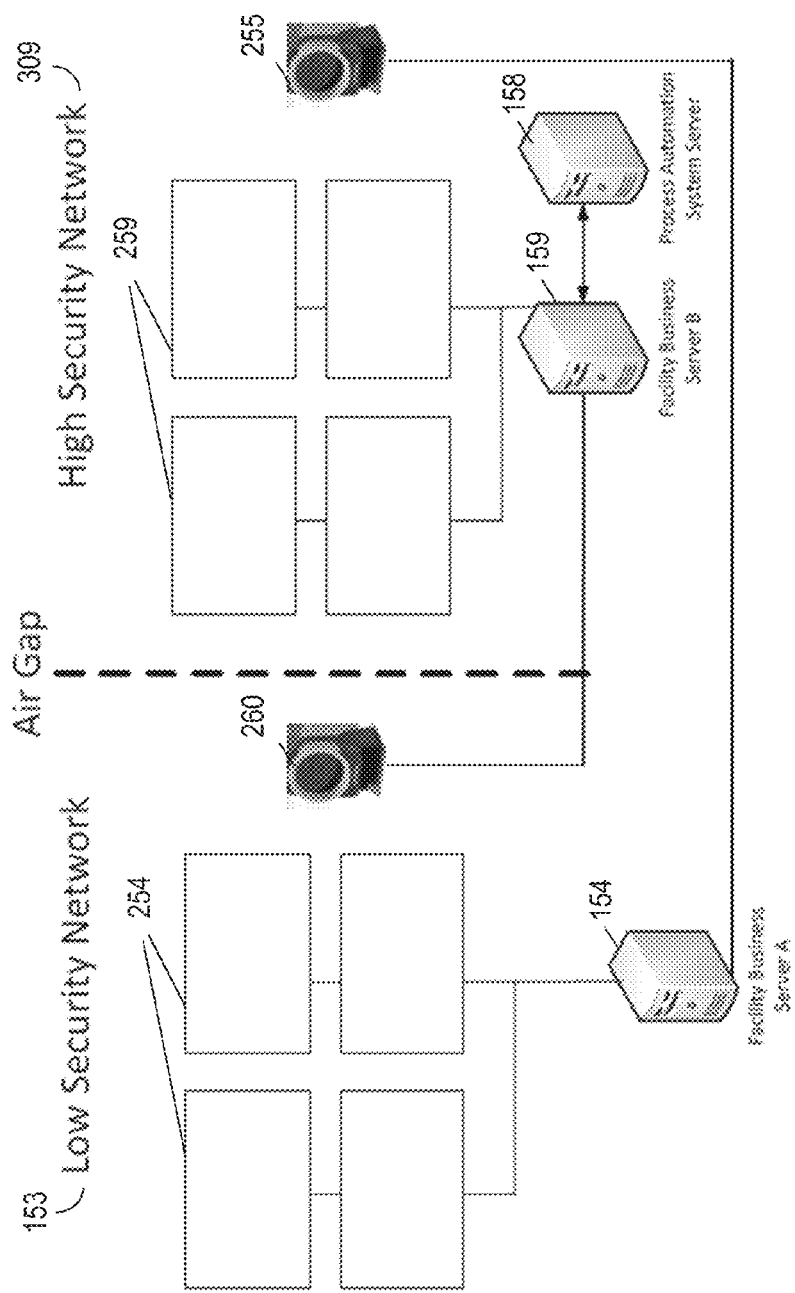
FIG. 3 is a schematic diagram of a system to transfer data between two or more networks configured to have different levels of network protection according to an embodiment of the invention.
Figure 4:
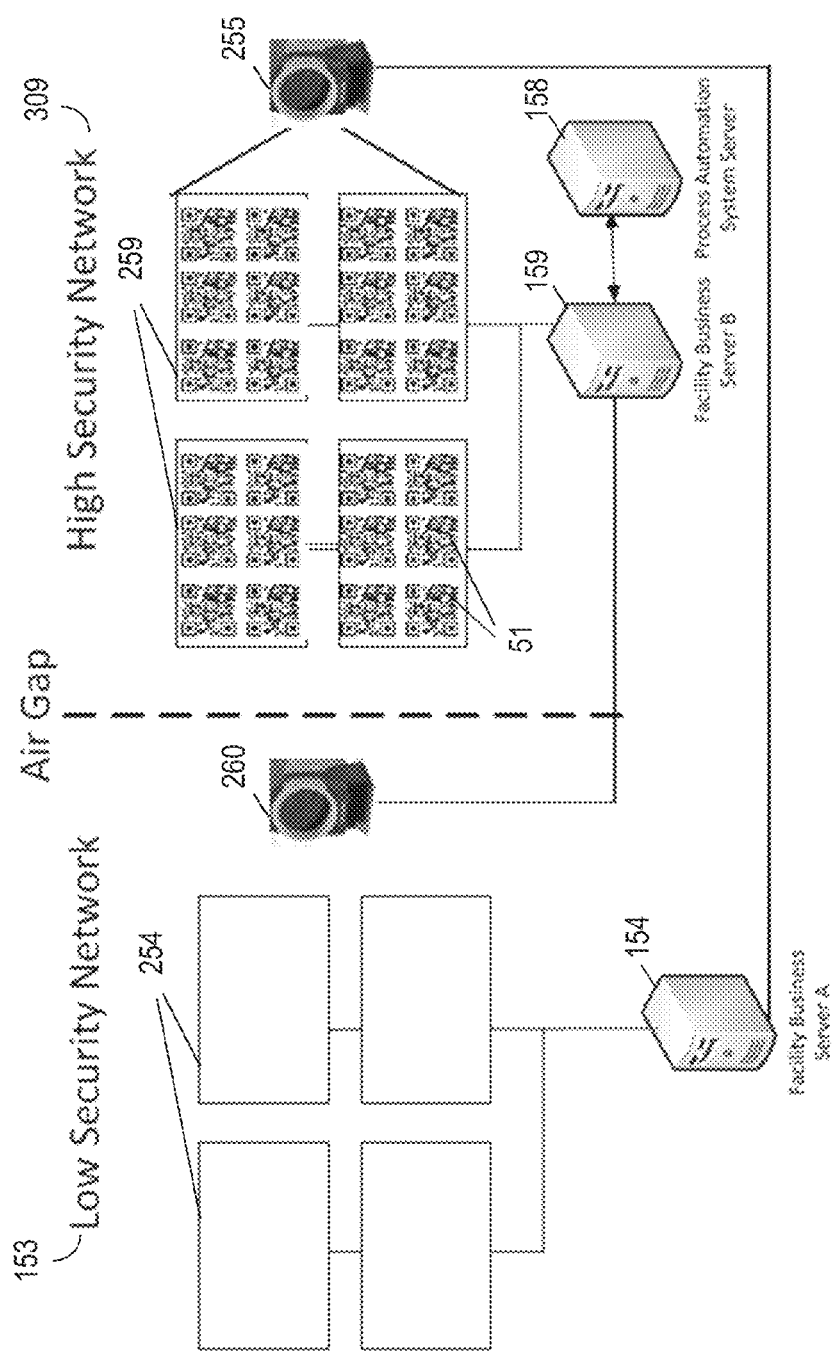
FIG. 4 is a schematic diagram of a system to transfer data between two or more networks configured to have different levels of network protection according to an embodiment of the invention.
Figure 5:
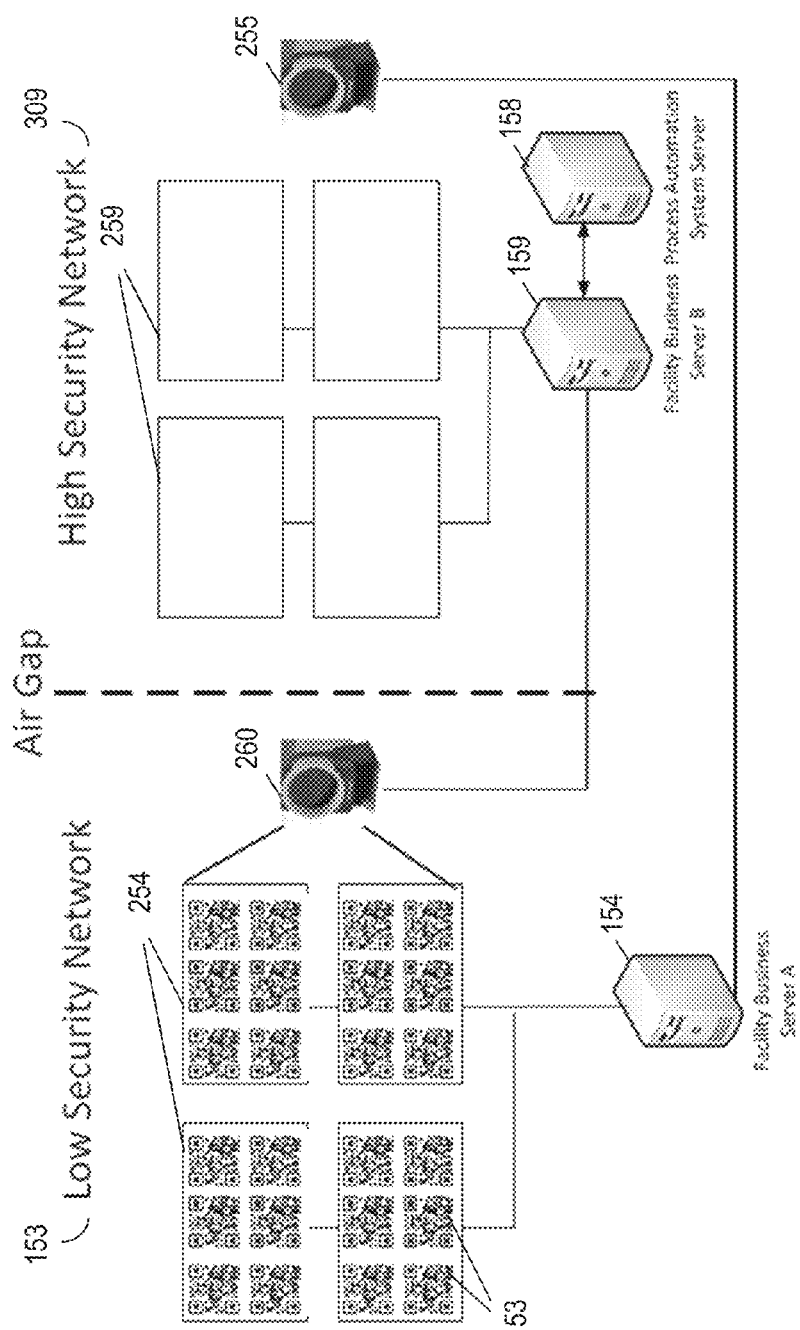
FIG. 5 is a schematic diagram of a system to transfer data between two or more networks configured to have different levels of network protection according to an embodiment of the invention.
Figure 6:
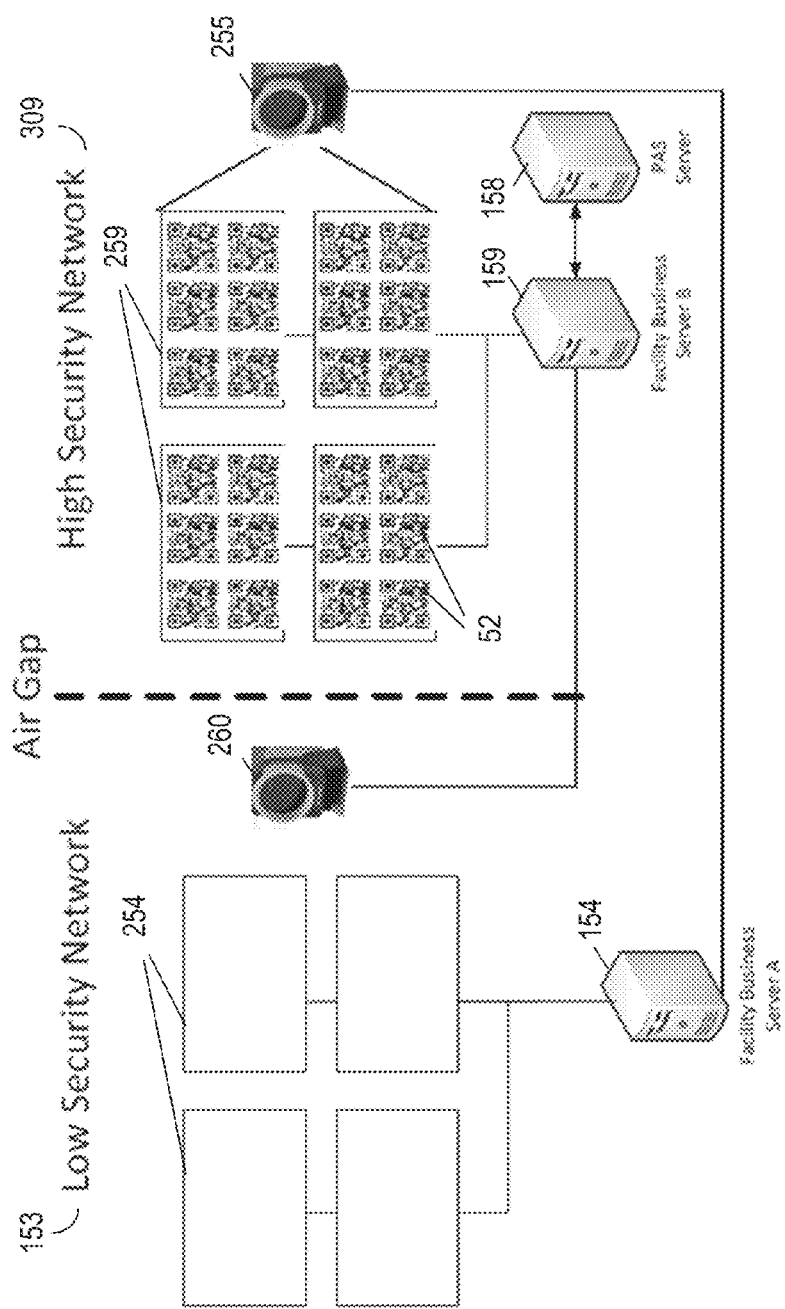
FIG. 6 is a schematic diagram of a system to transfer data between two or more networks configured to have different levels of network protection according to an embodiment of the invention.
Figure 7:
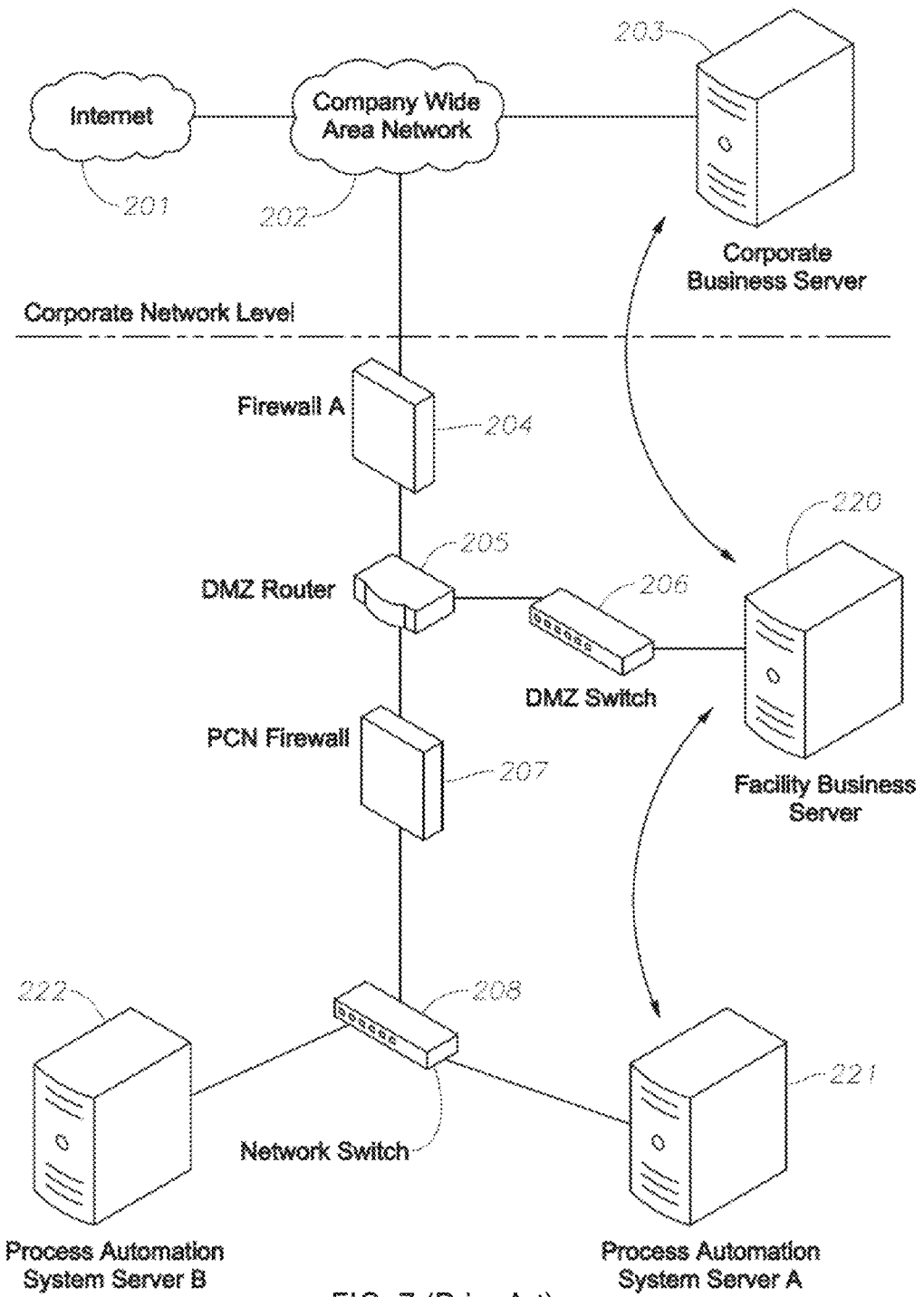
FIG. 7 is a schematic diagram of a system including a demilitarized zone (DMZ), according to the prior art.
Figure 14B:
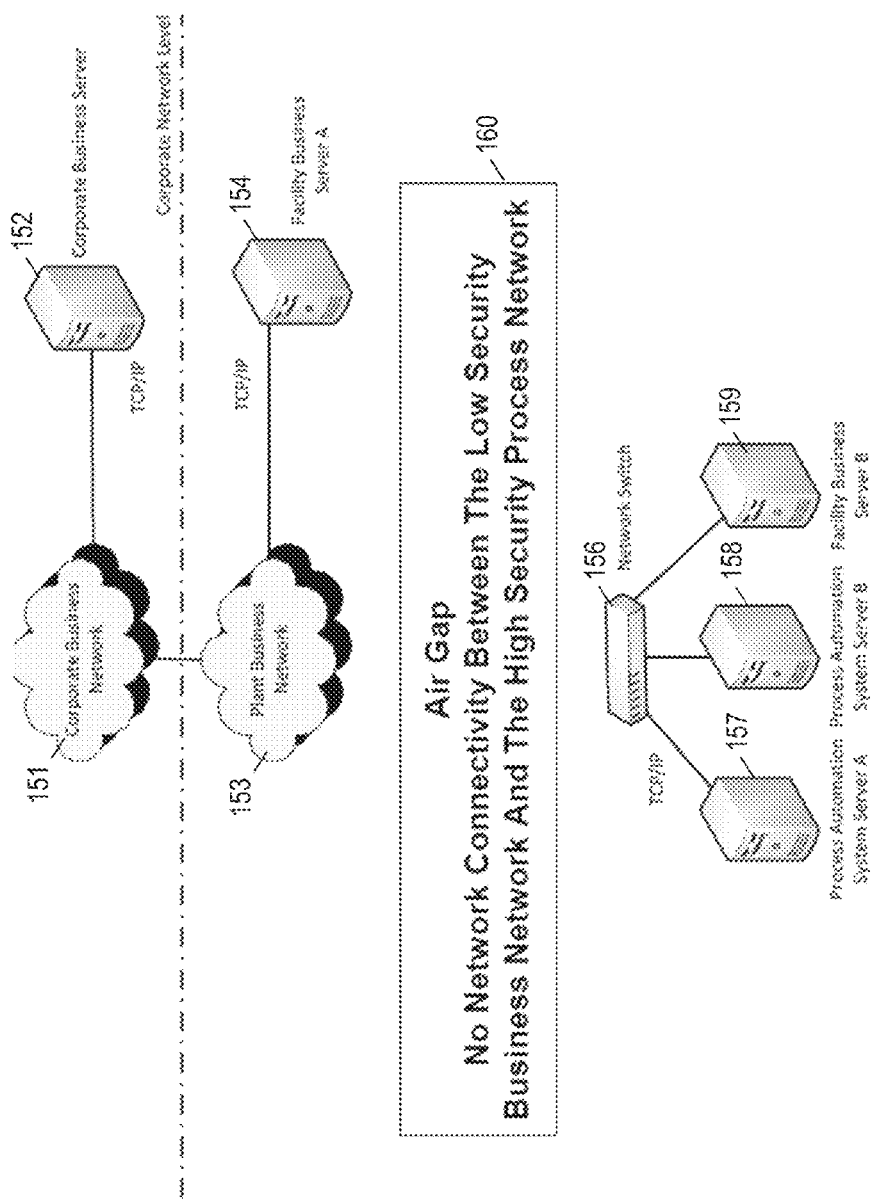
FIG. 14b is a schematic diagram of a system to transfer data between two or more networks configured to have different levels of network protection according to an embodiment of the invention.

As an example, a facility business server B 159 can be a first computer 30 according to an embodiment, and a facility business server A 154 can be a second computer 10, as illustrated in FIG. 3 and FIG. 14a, for example. In that example, the plant IT network 153, as illustrated in FIG. 14a, can be a second network 1 associated with facility business server A 154. The plant IT network 153 (sometimes called a plant business network 153, as illustrated in FIG. 14b, for example) can be in communication with a company wide area network 151 (sometimes called a corporate business network 151, as illustrated in FIG. 14b, for example). A process automation system network 309 can be a first network 3 associated with facility business server B 159. Data backup files can be transmitted from process automation server B 158 to facility business server B 159, for example, using two-way TCP/IP communication. If any of the data backup files are too large to enable encoding of their contents in one data barcode, facility business server B 159 can partition the data backup files into smaller, partitioned files for purposes of encoding and transmission. Facility business server B 159 can then encode contents of the partitioned files as data barcodes 51 and generate data barcodes 51 on a display 259, as illustrated in FIG. 4, for example. Facility business server A 154 can use a barcode scanning device 255 to scan the display 259 of facility business server B 159. The barcode scanning device 255 associated with facility business server A 154 can be triggered to scan responsive to generation of the data barcodes 51 on the display 259 of facility business server B 159. Facility business server A 154 can then decode the data barcodes 51 to produce contents of the partitioned files and store decoded contents of the partitioned files in a temporary location. Facility business server A 154 can then generate validation barcodes 53 on a display 254 to securely communicate decoded contents of the partitioned files to facility business server B 159, as illustrated in FIG. 5, for example. Facility business server B 159 can scan the display 254 of facility business server A 154 then decode the validation barcodes 53 to produce decoded contents of the partitioned files. Scanning the display 254 of facility business server A 154 can be automatically triggered by generation of the validation barcodes 53 on the display 259. Facility business server B 159 can then store the securely communicated decoded contents of the partitioned files in a temporary location. Facility business server B 159 can further compare the securely communicated decoded contents of the partitioned files to contents of the partitioned files. In this way, facility business server B 159 can determine whether facility business server A 154 received all contents of the data backup files that were intended to be transmitted or whether an error occurred in transmission. Facility business server B 159 can then generate verification barcodes 52 on a display 259, as illustrated in FIG. 6, for example. Facility business server A 154 can use a barcode scanning device 255 to scan the display 259 of facility business server B 159. Facility business server A 154 can then decode the verification barcodes 52 to produce contents of the verification files and thereby confirm the success of the transmission of contents of the data backup files. Facility business server A 154 can further merge decoded contents of the partitioned files into reassemblages of the data backup files. Facility business server A 154 can also store the reassemblages of the data backup files. Advantageously, an embodiment thus can allow contents of data backup files to be securely communicated across the air gap 160 while enabling confirmation that transmission was successful. In other examples, a facility business server A 154 can be a first computer 30 according to an embodiment, and a facility business server B 159 can be a second computer 10, as illustrated in FIG. 14a. Advantageously, large quantities of data, such as data backup files, can be transmitted.

Furthermore, an embodiment can thus eliminate requirements for Microsoft Windows patch management, anti-virus patch management, firewalls, intrusion prevention, data diodes, other hardware or software security devices, and two-way TCP/IP communication to transfer data between a low-security network and a high-security network. An embodiment can also eliminate risks of remote computer virus infection and remote unauthorized entry to a downstream process automation system, for example. When fewer security devices are installed on a network, energy costs can also be reduced, as can overall maintenance costs, capital investment costs, and manpower costs. An embodiment can therefore alleviate the requirements for ongoing patch management and for continuous testing and monitoring of security devices such as firewalls, intrusion prevention, and data diodes.

Specifically, benefits to an entity can include: (1) eliminating the requirements for Microsoft Windows patch management; (2) eliminating the requirements for anti-virus patch management; (3) eliminating the requirements for firewalls; (4) eliminating the requirements for intrusion prevention; (5) eliminating the requirements for data diodes; (6) eliminating the requirements for other hardware/software security devices; (7) eliminating the requirement to have two-way TCP/IP communication to transfer data between an LSN and an HSN; (8) eliminating the risk of remote unauthorized entry to a downstream process automation system; (9) eliminating the risk of remote computer virus infection; (10) reduced energy costs due to fewer security devices installed on the network when compared to data diode design; and (11) reduced overall maintenance costs due to reduced physical hardware and software installations.

For example, an embodiment can utilize two-dimensional/QR Code multi-barcode scanning technology to transfer contents of data backup files between a low-security network (LSN) and a high-security network (HSN) that are physically isolated for business and operational transactions. An HSN can be a critical network that requires total isolation from all other networks in a corporation, such as a process automation system (PAS) network. A corporate business network (CBN) can be considered an LSN because the criticality of a data loss would have a smaller impact on company business when compared to an HSN. An embodiment as described can be particularly advantageous for performing data backup. For example, maintenance of a high-security network can require backing up data related to, e.g., event logs, configuration data, or imaged data. It can be desirable to export this data from the high-security network to a low-security network to back up the data without exposing the high-security network to any risks. An embodiment can advantageously enable such backups.

More specifically, an embodiment can utilize standard hardware with a customized network design and two-dimensional/QR Code barcoding technology to move digitally stored information, such as contents of data backup files, back and forth between two isolated networks. An embodiment can further eliminate the requirement for two-way communication via traditional networking methods, i.e., TCP/IP, or for custom data diodes, since data transfer between two isolated networks can be accomplished through two-dimensional/QR Code multi-barcode scanning technology. An embodiment can therefore eliminate the need to conduct security patch management for an HSN. Also, hardware security devices can be no longer required for the HSN since the network can be completely isolated. As a result, overall capital investment, as well as manpower costs, can be reduced significantly.

An embodiment can advantageously move data, such as, for example, contents of database records or data backup files, for backup purposes, for example, between an HSN and an LSN while maintaining a physical separation between these networks. For example, an entity could desire to move contents of database records to another network to back up the data for information assurance purposes. Further, an entity could desire to move contents of existing data backup files (such the product of imaging one or more computers positioned within a network) to another network configured to have, for example, more available storage capacity than the first network where the existing data backup files are currently stored. For example, an HSN could have relatively smaller data storage capacity than an LSN, and a plurality of large data backup files could be positioned in storage on the HSN. The limited data storage capacity on the HSN could necessitate storing data backup files for only a short period of time, e.g., six months. However, the entity could wish to keep the data backup files for longer than six months for information assurance purposes, for example. In that situation, the entity could wish to move the data backup files or their contents to the LSN to enable a longer retention period without exposing the HSN to possible intrusion or attack. Embodiments of the invention advantageously can enable this movement.

Figure 1:
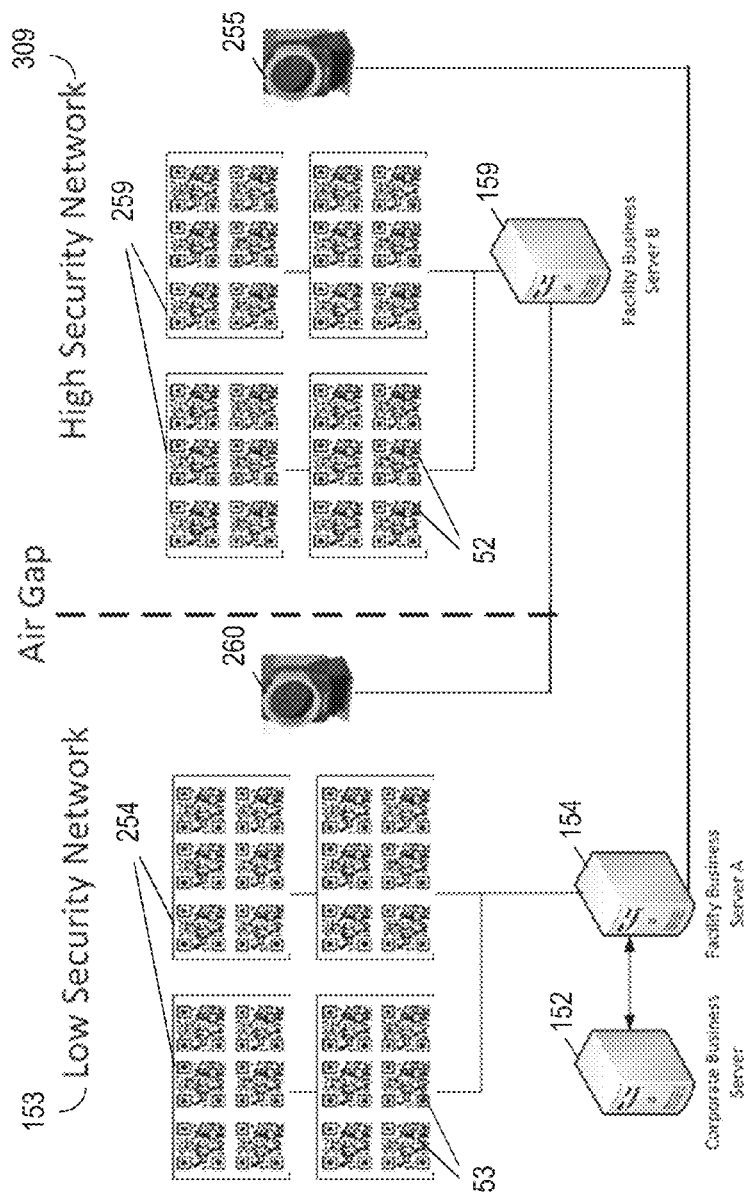
FIG. 1 is a schematic diagram of a system to transfer data between two or more networks configured to have different levels of network protection according to an embodiment of the invention.
Figure 2:
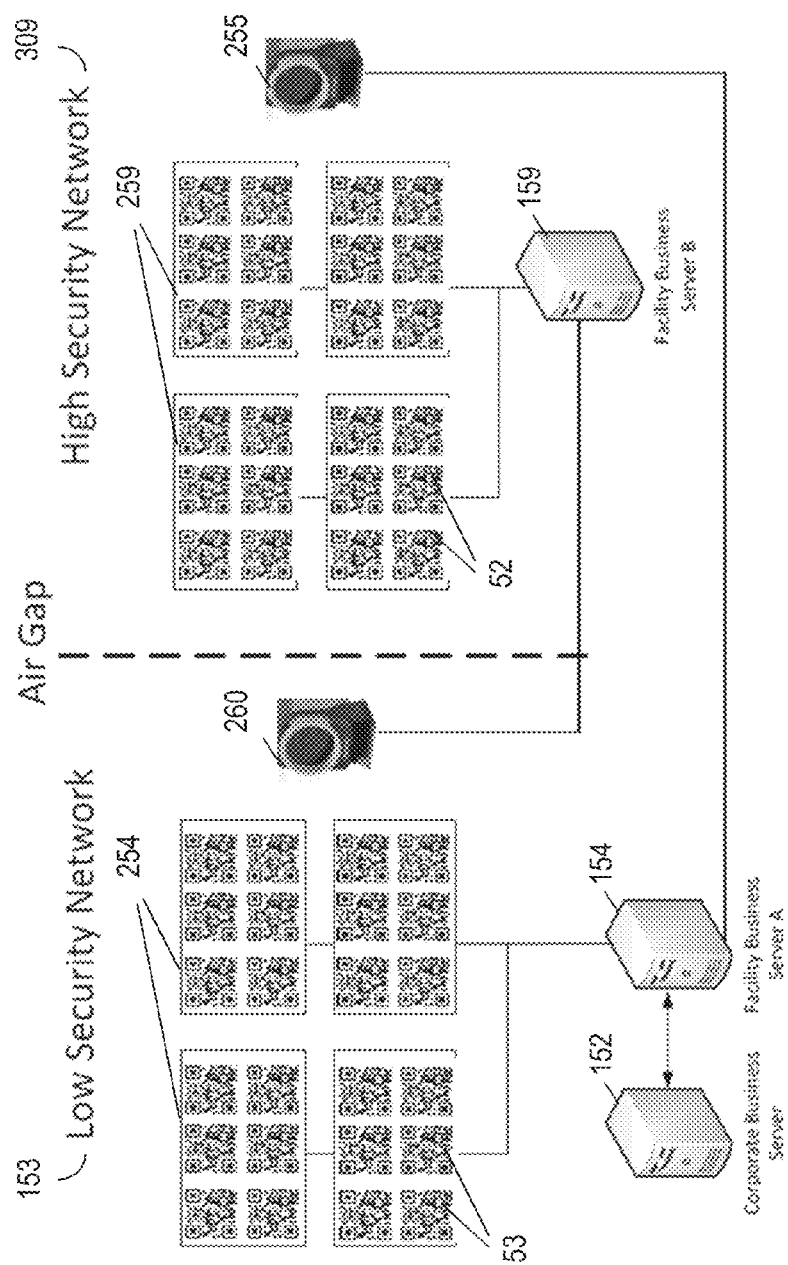
FIG. 2 is a schematic diagram of a system to transfer data between two or more networks configured to have different levels of network protection according to an embodiment of the invention.

For instance, an embodiment can relate to a setup including two hardened servers with one or more flat panel screens. Facility business server A 154, which can be located on an LSN, can have two-way communications with a corporate business server 152 on a CBN, such as a company wide area network 151, for example, as illustrated in FIG. 1. Facility business server A 154 can also be located at an operating facility in the same physical room as facility business server B 159. Facility business server A 154 can be connected to a plant business network (PBN), such as a plant IT network 153, which can be physically isolated from a PAS network 309 where facility business server B 159 can be connected. In other words, the CBN can have no path of communication between the HSN 309 and the LSN 153. Data can flow from facility business server B 159 to facility business server A 154 through two-dimensional/QR Code multi-barcode scanning technology, with verification data from facility business server A 154 to facility business server B 159 also flowing through two-dimensional/QR Code multi-barcode scanning technology. This technology can provide the ability to scan multiple barcodes simultaneously. Each server can have one or more associated large field-of-view barcode readers 73 (e.g., barcode scanning devices 255 and 260) pointed toward its respective counterpart screen of the other server, as illustrated, for example, in FIG. 2. Facility business server B 159 can have customized software developed to break apart, i.e., partition, contents of files larger than 1 MB and generate multiple barcodes simultaneously that can fill each screen 254. Contents of files smaller than 1 MB can be converted to barcodes automatically, i.e., without being partitioned. The large field-of-view scanner 255 of facility business server A 154 can be used to obtain all barcode data simultaneously and store the decoded data in a temporary directory. One or more two-dimensional/QR Code multi-barcode scanners 260 can be connected to facility business server B 159, which can have customized software to scan the screen 254 of facility business server A 154 to determine if scans were successful or a rescan of any barcode is required. Once the data is received by facility business server A 154, barcodes 52 can be generated and placed on the screen 254 for the barcode scanner 260 of facility business server B 159 to auto trigger the scanning process based on new software developed for this feature. The software on facility business server B 159 can compare the data collected from the process servers, for example, and the data received from facility business server A 154 to determine if the data was received accurately on facility business server A 154. Once completed, facility business server B 159 can generate a two-dimensional barcode 52 that communicates successful transfer of the data. Facility business server B 159 can then merge stored files that are larger than 1 MB and store them along with files smaller than 1 MB.

More specifically, data backup files can be transferred from process automation system server 158 to facility business server B 159 via two-way TCP/IP communication, as illustrated, for example, in FIG. 3. Facility business server B 159 can break apart, i.e., partition, contents of data backup files for transfer into smaller, e.g., 1 MB, files and convert the smaller files to multiple barcodes 51 simultaneously. Facility business server B 159 can then display the barcodes 51 on a screen 259, as illustrated, for example, in FIG. 4. The large field barcode scanner 255 of facility business server A 154 can then be auto triggered by software to scan the screen 259 of facility business server B 159. Facility business server A 154 can then store decoded contents of the smaller files in a temporary directory to capture decoded contents of the smaller files from facility business server B 159. Facility business server A 154 can then convert decoded contents of the smaller files as received into barcodes 53 and display the barcodes 53 on its screens 254. Facility business server B 159 can auto trigger its large field barcode scanners 260 to obtain decoded contents of the data encoded in barcodes 53, i.e., the decoded contents of the smaller files as received on facility business server A 154, to capture decoded contents of the smaller files as received on facility business server A 154 for archiving, and to commence a verification process, as depicted in FIG. 5, for example. Facility business server B 159 software can then perform a comparison between the data sent to and received from facility business server A 154. This can ensure that decoded contents of the smaller files received on facility business server A 154 are correct. Facility business server B 159 can move data backup files larger than 1 MB into a single data backup file or move data backup files smaller than 1 MB to a new folder indicating successful transfer. Facility business server B 159 can keep all data backup files related to a single data backup file larger than 1 MB and keep single data backup files smaller than 1 MB in the same folder if the transfer was unsuccessful. Facility business server B 159 can then prepare for re-encoding. Facility business server B 159 can display new barcodes 52 for successful/unsuccessful data transfer, as illustrated in FIG. 6, for example. The barcode scanner 255 of facility business server A 154 can be auto triggered to scan facility business server B 159. Facility business server A 154 can then merge decoded contents of the smaller files that correspond to a data backup file larger than 1 MB into a single file or save decoded contents of the data backup files smaller than 1 MB to its hard disk, if a successful transfer is indicated. Facility business server A 154 can discard all decoded contents of the smaller files that correspond to a data backup file larger than 1 MB and discard decoded contents of the data backup files smaller than 1 MB if the transfer was unsuccessful. The screens 254 and 259 of facility business server A 154 and facility business server B 159, respectively, can be cleared for a next cycle. Contents of data backup files can thus be moved between an LSN and an HSN even when the data backup files are too large to enable encoding of their contents in one barcode.

An embodiment can enable contents of data backup files to be transferred from an HSN to an LSN, e.g., from facility business server B 159 to facility business server A 154. For example, data backup files can be transferred from process automation server 158 to facility business server B 159 via two-way TCP/IP communication. Facility business server B 159 can then, if necessary, break apart the data backup files for transfer—i.e., partition the data backup files into relatively smaller files, such as 1 MB files—and convert them to multiple barcodes 51 simultaneously. In some instances, one or more data backup files do not need to be partitioned prior to encoding of their contents. Facility business server B 159 can then display the barcodes 51 on a screen 259. The large field barcode scanner 255 of facility business server A 154 can be auto triggered by software to scan the screen 259 of facility business server B 159. Facility business server A 154 can then store the decoded contents of the smaller files in a temporary directory to capture decoded contents of the smaller files from facility business server B 159. Facility business server A 154 can also convert the decoded contents of the smaller files into barcodes 53 and display them as barcodes 53 on its screens 254. Facility business server B 159 can auto trigger its large field barcode scanners 260 to obtain contents of the data encoded in barcodes 53, i.e., decoded contents of the smaller files as received on facility business server A 154, to commence the verification process. Facility business server B 159 can then store the decoded data received by use of barcodes 53 in a temporary folder. Facility business server B 159 can also compare the data sent to and received from facility business server A 154. Facility business server B 159 can then, in some instances, move the data backup files and the smaller files to different folders if transfer was successful (i.e., so as to move them out of a folder designated to contain data queued to be transmitted to another network), although facility business server B 159 can keep the data backup files and the smaller files in their current location if transfer was unsuccessful (i.e., so as to enable restarting of the transfer process by re-encoding contents of the smaller files for another attempt at transmission). Facility business server B 159 can display new barcodes 52 for successful/unsuccessful file transfer. The barcode scanner 255 of facility business server A 154 can be auto triggered to scan the screen 259 of facility business server B 159. Facility business server A 154 can then merge decoded contents of the smaller files that correspond to a data backup file larger than 1 MB into a single file, i.e., a reassemblage of the respective data backup file, or save decoded contents of the data backup files smaller than 1 MB to its hard disk if a successful transfer is indicated. Facility business server A 154 can also discard all decoded contents of the smaller files that correspond to a data backup file larger than 1 MB and discard decoded contents of the data backup files smaller than 1 MB if the transfer was unsuccessful. The screens 254 and 259 of facility business server A 154 and facility business server B 159, respectively, can then be cleared for a next cycle.

An embodiment can also enable contents of data backup files to be transferred, for example, from an LSN to an HSN, e.g., from facility business server A 154 to facility business server B 159. For example, data backup files can be transferred from corporate business server 152 to facility business server A 154 via two-way TCP/IP communication. Facility business server A 154 can then break apart contents of the data backup files for transfer into smaller (e.g., 1 MB) files, for example, and convert them to multiple barcodes 51 simultaneously. Facility business server A 154 can then display the barcodes 51 on a screen 254. The large field barcode scanner 260 of facility business server B 159 can be auto triggered by software to scan the screen 254 of facility business server A 154. Facility business server B 159 can then store decoded contents of the smaller files in a temporary directory to capture contents of the smaller files from facility business server A 154. Facility business server B 159 can also convert the received data, i.e., decoded contents of the smaller files, into barcodes 53 and display the barcodes 53 on its screens 259. Facility business server A 154 can auto trigger its large field barcode scanners 255 to obtain the received data as encoded in barcodes 53 on facility business server B 159 by decoding the barcodes 53 to commence the verification process. Facility business server A 154 can then store the files in a temporary folder. Facility business server A 154 can also compare the data sent to and received from facility business server B 159. Facility business server A 154 can then, in some instances, move the data backup files and the smaller files to different folders if transfer was successful (i.e., so as to move them out of a folder designated to contain data queued to be transmitted to another network), although facility business server A 154 can keep the data backup files and the smaller files in their current location if transfer was unsuccessful (i.e., so as to enable restarting of the transfer process by re-encoding contents of the smaller files for another attempt at transmission). Facility business server A 154 can then display new barcodes 52 for successful/unsuccessful data transfer. The barcode scanner 260 of facility business server B 159 can be auto triggered to scan the screen 254 of facility business server A 154. Facility business server B 159 can then merge decoded contents of the smaller files that correspond to a data backup file larger than 1 MB into a single file, i.e., a reassemblage of the respective data backup file, or save decoded contents of the data backup files smaller than 1 MB to its hard disk if a successful transfer is indicated. Facility business server B 159 can also discard all decoded contents of the smaller files that correspond to a data backup file larger than 1 MB and discard decoded contents of the data backup files smaller than 1 MB if the transfer was unsuccessful. The screens 254 and 259 of facility business server B 159 and facility business server A 154, respectively, can then be cleared for a next cycle.

Data can be broken up into multiple pieces, i.e., partitioned into smaller files, and headers can then be added to the pieces, i.e., smaller files, before transfer to enable reassembly. Furthermore, a system administrator can designate or queue data to be transferred, for example, such as contents of data backup files.

An embodiment of the invention can have numerous advantages. For example, an embodiment can enable transfer of contents of data backup files in which individual data backup files are very large in size, e.g., 10 MB. An embodiment can also render remote virus infections and unauthorized remote access from external networks to a PAS network impossible. Implementation of an embodiment at a facility can therefore alleviate requirements for Microsoft Windows patch management and anti-virus patch management, as well as security devices such as firewalls, intrusion prevention, and data diodes. More specifically, an embodiment can transfer contents of data backup files between two physically isolated networks utilizing two-dimensional/QR Code multi-barcode scanning technology and customized processes. An embodiment can permit one-way data transfer for the purposes of securely transferring files from an HSN to an LSN. Two-way data transfer is proposed for functionality purposes. Moreover, rather than requiring two-way communications via TCP/IP to move contents of data backup files from an LSN to an HSN that is consequently subject to a remote computer virus infection or breach by unauthorized persons, an embodiment of the invention can utilize two-way data transfer technology through two-dimensional/QR Code multi-barcode scanning technology to send and receive data, such as contents of data backup files, between an HSN and an LSN. Additionally, an embodiment can benefit businesses by installing completely isolated PAS networks from a CBN while still retaining the ability to securely pass contents of data backup files from the HSN to the LSN without the requirement to have a physical connection. An embodiment can eliminate the requirement to have two-way TCP/IP communication to transfer data between an HSN and an LSN. An embodiment can eliminate the requirement to have a network connection for two-way communication between an LSN and an HSN, which require the ability to transfer data from the LSN to the HSN. Microsoft Windows and anti-virus patch management, as well as security technology for the HSN, can be no longer required since this network can be completely isolated.

An embodiment can utilize on-screen two-dimensional/QR Code multi-barcode scanning technology to transfer data backup files between two servers located on physically isolated networks, e.g., an HSN and an LSN. To prepare to use an embodiment of the invention, an entity can take the following steps, for example: (1) purchase two servers; (2) purchase eight screens; (3) purchase a minimum of two barcode scanners; (4) develop software to convert database fields to a two-dimensional/QR Code barcode; (5) develop software to populate multiple screens with multiple barcodes; (6) develop software to automatically scan for a barcode on a computer screen and store it on another server's database; (7) develop software to send data from one server to another for verification through barcodes; and (8) generate one or more new barcodes to confirm that data was transferred successfully.

An embodiment can, in some instances, be associated with use of a physically secured room (sometimes described as a "clean room"). That is, an embodiment can be utilized in facilities that have restricted-access rooms that are locked and secure to house, for example, servers associated with a high-security network. Persons with restricted access can, in some circumstances, perform data transfers between a high-security network and a low-security network within a physically secured room according to embodiments of the invention. Those authorized persons can include, for example, engineers or operations personnel. Anyone entering the room can be required to check any removable media or other items before entering the room. An embodiment can enable a control engineer, for example, to be frisked prior to entering a control room associated with the high-security network to perform the engineer's maintenance duties related to the network. An entity could choose to establish a physically secured room to minimize the risk of unauthorized data removal from—or unauthorized additions or changes to—a network by use of removable media. Consequently, use of a physically secured room in conjunction with an embodiment of the invention can further minimize the vulnerability of a high-security network while still allowing bidirectional data transmission.

Figure 15:
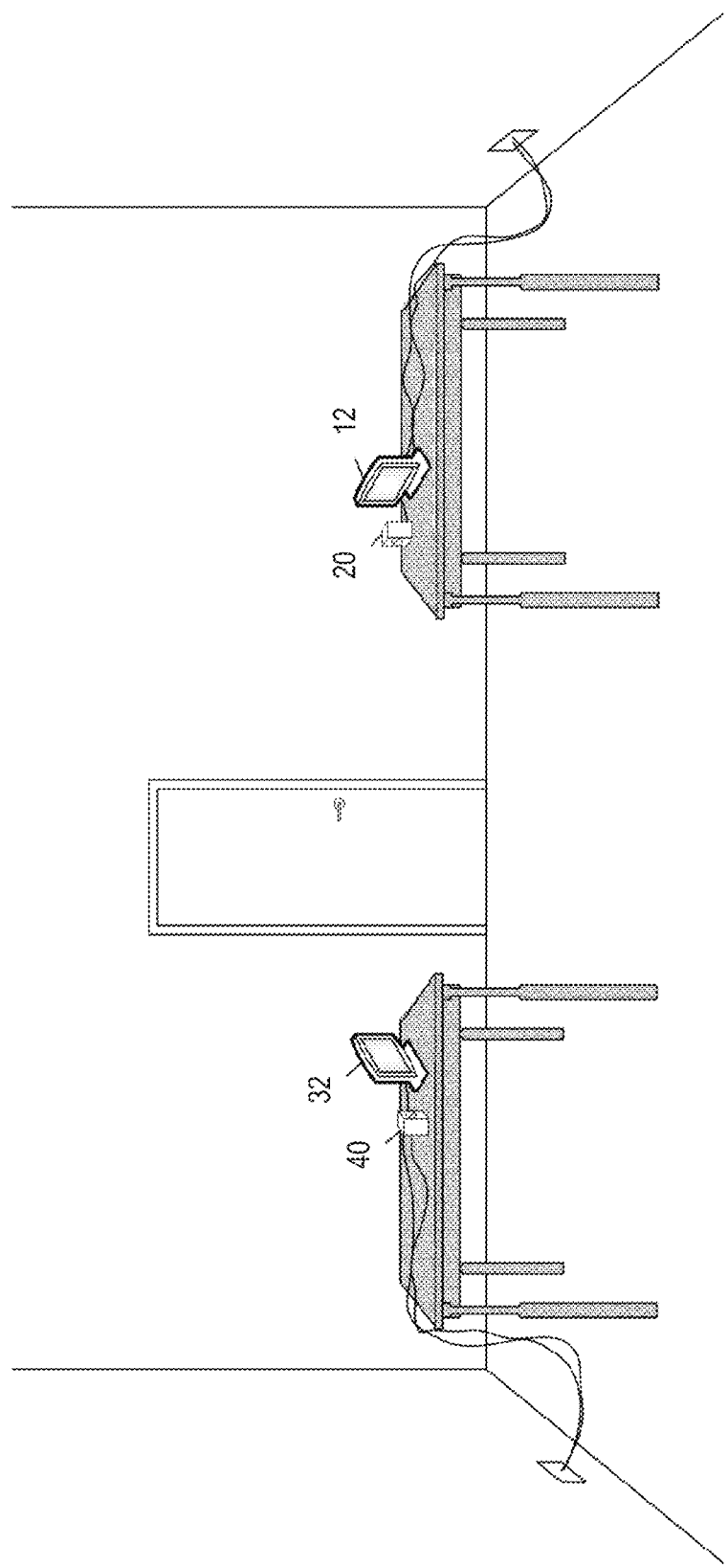
FIG. 15 is an environmental view of a physically secured room containing a system to transfer data between two or more networks configured to have different levels of network protection according to an embodiment of the invention.
Figure 16:
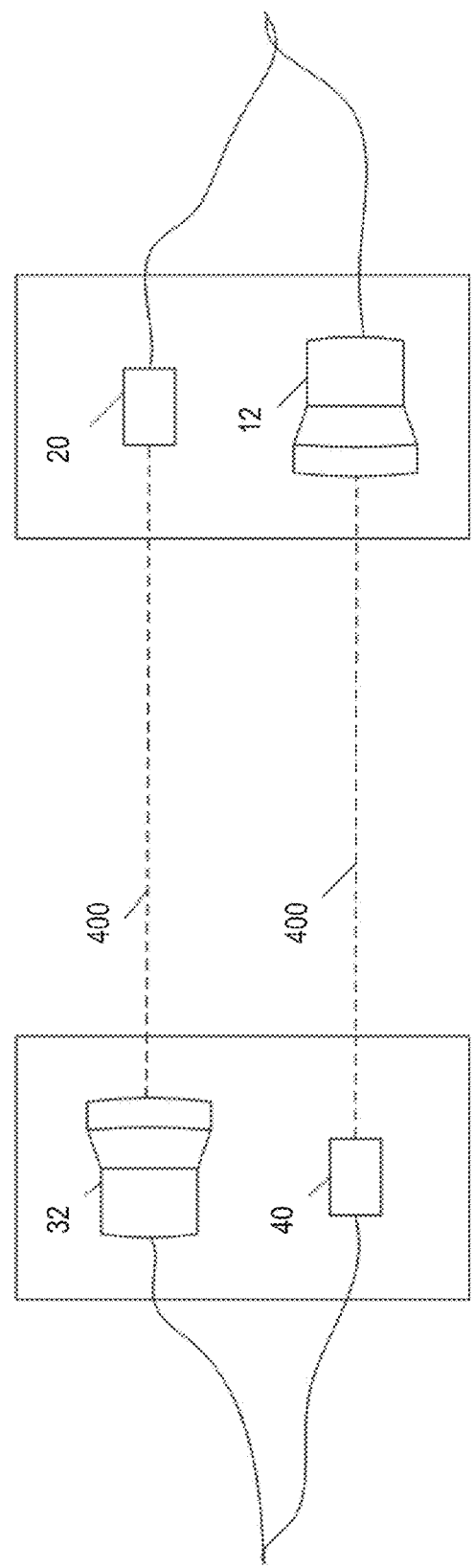
FIG. 16 is an environmental view of a physically secured room containing a system to transfer data between two or more networks configured to have different levels of network protection according to an embodiment of the invention.

In some circumstances, for example, a physically secured room can contain one or more displays 32 of a first computer 30 and one or more barcode scanning devices 40 in communication with the first computer 30, as illustrated, for example, in FIG. 15. The physically secured room can further contain one or more displays 12 of a second computer 10 and one or more barcode scanning devices 20 in communication with the second computer 10. The one or more barcode scanning devices 20 in communication with the second computer 10 can be positioned so as to establish a line of sight 400 that includes one or more of the one or more displays 32 of the first computer 30, as illustrated, for example, in FIG. 16. The one or more barcode scanning devices 20 and the one or more displays 32 can further be mounted so as to render them immobile and ensure that the line of sight 400 between them is maintained. Similarly, the one or more barcode scanning devices 40 in communication with the first computer 30 can be positioned so as to establish a line of sight 400 that includes one or more of the one or more displays 12 of the second computer 10, as illustrated in FIG. 16, for example. The one or more barcode scanning devices 40 and the one or more displays 12 can further be mounted so as to render them immobile and ensure that the line of sight 400 between them is maintained.

The one or more displays 12, the one or more displays 32, the one or more barcode scanning devices 20, and the one or more barcode scanning devices 40 can be stationary and fixed so as to ensure that line of sight 400 remains unimpeded to allow data transmission according to embodiments of the invention. Consequently, in such circumstances, data—such as data backup files, for example—can be transmitted between the first network 3 and the second network 1 without any need for user review or approval of the data to be transferred after a data transfer process has been initiated. A user or other person may, however, also manually initiate, approve, or supervise data transfers from within the physically secured room.

More generally, an embodiment can include, for example, computer-implemented methods to transfer data between two or more networks having different levels of network protection. Data to be transferred can be one or more types of digitally stored information, including, for example, data files, transactional database records, transactional data, and data backup files. A method according to an embodiment can include generating one or more data barcodes 51 on a display 32 of a first computer 30 in communication with and positioned within a first network 3, for example. The one or more data barcodes 51 can be configured to encode one or more pieces of digitally stored information positioned in the first network 3. For example, a data barcode 51 can encode digitally stored information including transactional data, such as information illustrated on the display 32 along with the data barcode 51. Further, the one or more pieces of digitally stored information can encode a set of data including a plurality of database field data of any database field types used for transactional data, such as numeric and text data. For instance, the one or more pieces of digitally stored information can encode a set of data, such as data in a set of Database Fields 1-6. An exemplary set of data in Database Fields 1-6, for example, can include one or more values in each database field. For example, Database Field 1 can have a value of 123459, Database Field 2 can have a value of 10412, Database Field 3 can have a value of 123456, Database Field 4 can have a value of XXX, Database Field 5 can have a value of 40,000, and Database Field 6 can have a value of 1. As another example, the one or more data barcodes 51 can encode a set of data relating to a product order and including, for instance, a customer order number, a driver identification number, a customer number, a product identifier, a measure of quantity, and a measure of units. That is, in such an example, Database Field 1 can relate to customer order number, Database Field 2 can relate to driver identification number, Database Field 3 can relate to customer identifiers, Database Field 4 can relate to product identifiers, Database Field 5 can relate measures of quantity, and Database Field 6 can relate to measures of units, for example. Furthermore, more than one data barcode 51 can encode pieces of digitally stored information, as illustrated in FIG. 12, for example. A method can further include decoding the one or more data barcodes 51 responsive to scanning the display 32 by use of one or more barcode scanning devices 20 in communication with a second computer 10. The second computer 10 can be positioned remote from the first computer and in communication with and positioned within a second network 1, as illustrated in FIG. 13, for example. The second network 1 can have a different level of network security protection than the first network 3 and be configured for only one-way secure communication from the second network 1 to the first network 3. A method can also include transferring the one or more decoded pieces of digitally stored information to temporary storage associated with the second network 1. For example, after scanning the display 32 by use of a barcode scanning device 20, as illustrated in FIG. 12, for example, the one or more data barcodes 51 can be decoded, and the one or more decoded pieces of digitally stored information can be transferred to temporary storage associated with the second network 1. For example, information related to the data from Database Fields 1-6 that is encoded in a data barcode 51, for instance, can be decoded and transferred to temporary storage. The information can also be displayed on a display 12 of the second computer 10, in some circumstances. A method can further include securely communicating copies of the one or more decoded pieces of digitally stored information in one-way direction from the second computer 10 to the first computer 30.

A method can also include generating—responsive to comparison of the securely communicated copies of the one or more decoded pieces of digitally stored information and the one or more pieces of digitally stored information positioned in the first network 3—one or more verification barcodes 52 on the display 32 of the first computer 30, for example. Comparison of the securely communicated copies of the one or more decoded pieces of digitally stored information and the one or more pieces of digitally stored information positioned in the first network 3 can include comparison by use of a verification table in a database, for example. The one or more verification barcodes 52 can be configured to encode one or more verification files to indicate success of a data transmission from the first network 3 to the second network 1. For example, a verification barcode 52 can encode one or more verification files indicating a successful transmission, and the display 32 of the first computer 30 can display text indicating successful transmission in some circumstances. A method can further include decoding responsive to scanning the display 32 of the first computer 30 by use of the one or more barcode scanning devices 20 in communication with the second computer 10—the one or more verification barcodes 52. Decoding the one or more verification barcodes 52 can thereby confirm success of a data transmission from the first network 3 to the second network 1. After decoding the one or more verification barcodes 52, a display 12 of the second computer 10 can display the same information (e.g., that Database Field 1 has a value of 123459, Database Field 2 has a value of 10412, Database Field 3 has a value of 123456, Database Field 4 has a value of XXX, Database Field 5 has a value of 40,000, Database Field 6 has a value of 1, and that transmission was successful), including successfulness of data transmission, as the display 32 of the first computer 30, for example. In some instances, successfulness of data transmission can be indicated by, for example, a numeral "one" for successful and a numeral "zero" for unsuccessful. A method can also include storing, responsive to an indication in the one or more verification files of successful data transmission of the one or more pieces of digitally stored information, the one or more pieces of digitally stored information in permanent storage associated with the second network 1. A method according to an embodiment can further include discarding the one or more pieces of digitally stored information in temporary storage associated with the second network 1, responsive to an indication in the one or more verification files of unsuccessful data transmission of the one or more pieces of digitally stored information. Additionally, decoding the one or more data barcodes 51 according to an embodiment can include disregarding error-correction capabilities of the one or more data barcodes 51.

In some methods to transfer data between two or more networks having different levels of network protection according to an embodiment of the invention, a method can include decoding one or more data barcodes 51. Decoding the one or more data barcodes 51 can be responsive to scanning from a display 32 of a first computer 30 in communication with and positioned within a first network 3 by use of one or more barcode scanning devices 20 in communication with a second computer 10. The second computer 10 can be positioned remote from the first computer 30 and in communication with and positioned within a second network 1. Decoding the one or more data barcodes 51 can also produce contents of one or more pieces of digitally stored information represented by the one or more data barcodes 51 and associated with the first network 3. The second network 1 can have a different level of network security protection than the first network 3 and can be configured for only one-way secure communication from the second network 1 to the first network 3. A method can further include securely communicating copies of contents of the one or more decoded pieces of digitally stored information in one-way communication from temporary storage associated with the second network 1 to the first network 3 for comparison to the one or more pieces of digitally stored information associated with the first network 3. Temporary storage associated with the second network 1 can include, for example, temporary storage 16 of the second computer 10, as illustrated, for example, in FIG. 13. A method can further include decoding, responsive to scanning the display 32 of the first computer 30 by use of the one or more barcode scanning devices 20 in communication with the second computer 10, one or more verification barcodes 52 configured to encode one or more verification files to indicate success of transmission of the one or more pieces of digitally stored information from the first network 3 to the second network 1. Decoding the one or more verification barcodes 52 can produce contents of the one or more verification files represented by the one or more verification barcodes 52 and thereby confirm success of the transmission of the one or more pieces of digitally stored information from the first network 3 to the second network 1. A method can further include storing contents of the one or more decoded pieces of digitally stored information in more permanent storage associated with the second network 1, responsive to an indication from contents of the one or more verification files of successful data transmission of the one or more pieces of digitally stored information associated with the first network 3 to the second network 1. More permanent storage associated with the second network 1 can include, for example, permanent storage 17 of the second computer 10, as illustrated, for example, in FIG. 13. Decoding one or more data barcodes 51 according to an embodiment can include disregarding error-correction capabilities of the one or more data barcodes 51. In addition, a method according to an embodiment can further include discarding the one or more decoded pieces of digitally stored information, responsive to an indication from contents of the one or more verification files of unsuccessful data transmission of the one or more pieces of digitally stored information.

In some circumstances, for example, the first network 3 can be a high-security network, and the second network 1 can be a low-security network. In other circumstances, the first network 3 can be a low-security network, and the second network 1 can be a high-security network. Notably, as will be understood by those skilled in the art, the one or more data barcodes 51 and the one or more verification barcodes 52 can be one or more of the following: two-dimensional matrix codes, QR Codes, Aztec Codes, and PDF417 codes. Validation barcodes 53 can likewise be two-dimensional matrix codes, such as, for example, QR Codes or Aztec Codes, or PDF417 codes, for example. As will be understood by those skilled in the art, a barcode scanning device, such as a barcode scanning device 20 or a barcode scanning device 40, can include one or more of the following: a barcode reading device 72, a QR Code reading device, a field-of-view barcode reading device 73, and a camera, as illustrated, for example, in FIG. 10a and FIG. 10b. In FIG. 10a, a computer 70 is connected to a display 71 and a barcode reading device 72. Similarly, in FIG. 10b, a computer 70 is connected to a field-of-view barcode reading device 73, in addition to a display 71. A barcode scanning device 20 or a barcode scanning device 40 can have the ability to scan more than one barcode simultaneously.

For instance, in some computer-implemented methods according to an embodiment of the invention, securely communicating copies of the one or more decoded pieces of digitally stored information in one-way direction from the second computer 10 to the first computer 30 can include generating, on a display 12 of the second computer 10, one or more validation barcodes 53. The one or more validation barcodes 53 can be configured to encode copies of the one or more decoded pieces of digitally stored information in temporary storage associated with the second network 1. Securely communicating copies of the one or more decoded pieces of digitally stored information in one-way direction from the second computer 10 to the first computer 30 can further include decoding the one or more validation barcodes 53 responsive to scanning the display 12 of the second computer 10 by use of one or more other barcode scanning devices 40 in communication with the first computer 30. The one or more other barcode scanning devices 40 can be different than the one or more barcode scanning devices 20. Securely communicating copies of the one or more decoded pieces of digitally stored information in one-way direction from the second computer 10 to the first computer 30 can then include transferring the decoded copies of the one or more decoded pieces of digitally stored information to storage associated with the first network 3. For example, storage associated with the first network can include temporary storage 36 or permanent storage 37 of the first computer 30, as illustrated in FIG. 13. Further, the one or more pieces of digitally stored information can include one or more large files. The one or more barcode scanning devices 20 in communication with the second computer 10 and the one or more other barcode scanning devices 40 in communication with the first computer 30 can also be configured to scan a plurality of barcodes simultaneously. A method can also include, before generating one or more data barcodes 51, splitting, i.e., partitioning, each of a plurality of large files into two or more split files, i.e., partitioned files. A method can further include, after transferring the decoded pieces of digitally stored information to temporary storage 16 associated with the second network 1, merging each set of two or more decoded pieces of digitally stored information into each of the plurality of large files. The one or more large files can include one or more data backup files, as well.

Additionally, in some methods according to an embodiment, securely communicating copies of contents of the one or more decoded pieces of digitally stored information in one-way communication from temporary storage associated with the second network 1 to the first network 3 can include decoding one or more validation barcodes 53, responsive to scanning from a display 12 of the second computer 10 by use of one or more other barcode scanning devices 40 in communication with the first computer 30. The one or more validation barcodes 53 can be configured to encode one or more copies of contents of the one or more decoded pieces of digitally stored information. Further, the one or more pieces of digitally stored information can include one or more large files. The one or more barcode scanning devices 20 in communication with the second computer 10 and the one or more other barcode scanning devices 40 in communication with the first computer 30 can also be configured to scan a plurality of barcodes simultaneously. A method can also include, after decoding one or more data barcodes 51, merging one or more sets of pieces of digitally stored information into one or more large files. The one or more large files can include one or more data backup files, as well.

An embodiment can also include systems to transfer data between two or more networks having different levels of network protection. A system according to an embodiment can include a first computer 30 in communication with and positioned within a first network 3. The first computer 30 can include one or more processors 31 and one or more input and output units 33 in communication with the one or more processors 31. The first computer 30 can further include one or more displays 32 in communication with the one or more processors 31 and non-transitory memory medium 34 in communication with the one or more processors 31. For example, the first computer 30 can be a hardened server. The memory medium 34 can include computer-readable instructions stored therein that when executed cause the first computer 30 to perform steps. The computer-readable instructions can include, for example, a computer program 35, as illustrated in FIG. 13, for example. The memory medium 34 can also include temporary storage 36 and permanent storage 37. Steps performed by the first computer 30 can include generating one or more data barcodes 51 on one or more of the one or more displays 32 of the first computer 30. The one or more data barcodes 51 can be configured to encode one or more pieces of digitally stored information positioned in the first network 3. Steps performed by the first computer 30 can further include generating—responsive to comparison of the one or more pieces of digitally stored information positioned in the first network 3 and copies of the one or more pieces of digitally stored information securely communicated from a second network 1—one or more verification barcodes 52 on one or more of the one or more displays 32 of the first computer 30. The one or more verification barcodes 52 can be configured to encode one or more verification files to indicate success of a data transmission from the first network 3 to the second network 1. A system can further include a second computer 10 positioned remote from the first computer 30 and in communication with and positioned within the second network 1. The second network 1 can have temporary storage and separate permanent storage associated therewith. For example, temporary storage associated with the second network 1 can include temporary storage 16 of the second computer 10, for example, as illustrated in FIG. 13. Permanent storage associated with the second network 1 can include permanent storage 17 of the second computer 10, for example. The second network 1 can have a different level of network security protection than the first network 3 and can be configured for only one-way secure communication from the second network 1 to the first network 3. The second computer 10 can include one or more processors 11 and one or more input and output units 13 in communication with the one or more processors 11 of the second computer 10. The second computer 10 can further include one or more barcode scanning devices 20 in communication with the one or more processors 11 of the second computer 10 and positioned to enable scanning of the one or more displays 32 of the first computer 30. The second computer 10 can also include non-transitory memory medium 14 in communication with the one or more processors 11 of the second computer 10. For example, the second computer 10 can be a hardened server. The memory medium 14 can include computer-readable instructions stored therein that when executed cause the second computer 10 to perform steps.

Steps performed by the second computer 10 can include decoding the one or more data barcodes 51, responsive to scanning the one or more of the one or more displays 32 of the first computer 30 by use of the one or more barcode scanning devices 20. Scanning the one or more of the one or more displays 32 according to an embodiment can be automatically triggered by generation of one or more data barcodes 51 on one or more of the one or more displays 32. Steps performed by the second computer 10 can further include transferring the one or more decoded pieces of digitally stored information to the temporary storage associated with the second network 1. Steps performed by the second computer 10 can also include securely communicating copies of the one or more decoded pieces of digitally stored information in one-way direction from the second computer 10 to the first computer 30. Steps performed by the second computer 10 can then include decoding, responsive to scanning the one or more of the one or more displays 32 of the first computer 30 by use of the one or more barcode scanning devices 20, the one or more verification barcodes 52. Decoding the one or more verification barcodes 52 can thereby confirm success of a data transmission from the first network 3 to the second network 1. Steps performed by the second computer 10 can further include storing the one or more pieces of digitally stored information in the permanent storage associated with the second network 1, responsive to an indication in the one or more verification files of successful data transmission of the one or more pieces of digitally stored information. Further, one or more of the one or more displays 32 can be cleared after steps have been performed, for example. In addition, the memory medium 14 of the second computer 10 can further include computer-readable instructions stored therein that when executed cause the second computer 10 to perform the step of discarding the decoded pieces of digitally stored information in the temporary storage associated with the second network 1, responsive to an indication in the one or more verification files of unsuccessful data transmission of the pieces of digitally stored information.

In some systems to transfer data between two or more networks having different levels of network protection according to an embodiment of the invention, a system can include a first computer 30 in communication with and positioned within a first network 3 and a second computer 10 positioned remote from the first computer 30 and in communication with and positioned within a second network 1. The first computer 30 can include one or more processors 31 and one or more displays 32 in communication with the one or more processors 31. In addition, the second network 1 can have temporary storage and separate more permanent storage associated therewith. For example, temporary storage associated with the second network 1 can include temporary storage 16 of the second computer 10, for example, as illustrated in FIG. 13. Permanent storage associated with the second network 1 can include permanent storage 17 of the second computer 10, for example. The second network 1 can also have a different level of network security protection than the first network 3 and can be configured for only one-way secure communication from the second network 1 to the first network 3. The second computer 10 can include one or more processors 11 and one or more input and output units 13 in communication with the one or more processors 11. The second computer 10 can also include one or more barcode scanning devices 20 in communication with the one or more processors 11 and non-transitory memory medium 14 in communication with the one or more processors 11. The memory medium 14 can include computer-readable instructions stored therein that when executed cause the second computer 10 to perform steps.

Steps performed by the second computer 10 can include decoding one or more data barcodes 51, responsive to scanning from one or more of the one or more displays 32 of the first computer 30 by use of the one or more barcode scanning devices 20. Decoding the one or more data barcodes 51 can produce contents of one or more pieces of digitally stored information represented by the one or more data barcodes 51 and associated with the first network 3. Steps performed by the second computer 10 can further include securely communicating copies of contents of the one or more decoded pieces of digitally stored information in one-way communication from the temporary storage associated with the second network 1 to the first network 3 for comparison to the one or more pieces of digitally stored information associated with the first network 3. Steps performed by the second computer 10 can also include decoding—responsive to scanning one or more of the one or more displays 32 of the first computer 30 by use of the one or more barcode scanning devices 20—one or more verification barcodes 52 configured to encode one or more verification files to indicate success of transmission of the one or more pieces of digitally stored information from the first network 3 to the second network 1. Decoding the one or more verification barcodes 52 can produce contents of the one or more verification files represented by the one or more verification barcodes 52 and thereby confirm success of the transmission of the one or more pieces of digitally stored information from the first network 3 to the second network 1. Steps performed by the second computer 10 can further include storing contents of the one or more decoded pieces of digitally stored information in the more permanent storage associated with the second network 1, responsive to an indication from contents of the one or more verification files of successful data transmission of the one or more pieces of digitally stored information associated with the first network 3 to the second network 1. The memory medium 14 can further include computer-readable instructions stored therein that when executed cause the second computer 10 to perform the step of discarding the one or more decoded pieces of digitally stored information, responsive to an indication from contents of the one or more verification files of unsuccessful data transmission of the one or more pieces of digitally stored information.

In some systems according to an embodiment, the first network 3 can have storage associated therewith. In addition, the first computer 30 can further include one or more other barcode scanning devices 40 in communication with the one or more processors 31 of the first computer 30, as illustrated, for example, in FIG. 13. For example, storage associated with the first network 3 can include temporary storage 36 or permanent storage 37 of the first computer 30. The second computer 10 can further include one or more displays 12 in communication with the one or more processors 11 of the second computer 10. The one or more displays 12 can also be positioned to enable scanning thereof by the one or more other barcode scanning devices 40 of the first computer 30, as illustrated, for example, in FIG. 12. In FIG. 12, an air gap AG exists between the first computer 30 and the second computer 10. As illustrated in FIG. 12, for example, the first computer 30 and the second computer 10 can be in the same physical room. Securely communicating copies of the one or more decoded pieces of digitally stored information in one-way direction from the second computer 10 to the first computer 30 can include generating, on one or more of the one or more displays 12 of the second computer 10, one or more validation barcodes 53. The one or more validation barcodes 53 can be configured to encode copies of the one or more decoded pieces of digitally stored information in the temporary storage associated with the second network 1. The memory medium 34 of the first computer 30 can further include computer-readable instructions stored therein that when executed cause the first computer 30 to perform the steps of decoding the one or more validation barcodes 53 responsive to scanning the one or more of the one or more displays 12 of the second computer 10 by use of the one or more other barcode scanning devices 40 of the first computer 30 and transferring the decoded copies of the one or more decoded pieces of digitally stored information to the storage associated with the first network 3. Further, the one or more pieces of digitally stored information can include one or more large files. The one or more barcode scanning devices 20 in communication with the second computer 10 and the one or more other barcode scanning devices 40 in communication with the first computer 30 can also be configured to scan a plurality of barcodes simultaneously. The memory medium 34 of the first computer 30 can further include computer-readable instructions stored therein that when executed cause the first computer 30 to perform the step of, before generating one or more data barcodes 51, partitioning each of a plurality of large files into two or more partitioned files. Additionally, the memory medium 14 of the second computer 10 can further include computer-readable instructions stored therein that when executed cause the second computer 10 to perform the step of, after transferring the one or more decoded pieces of digitally stored information to temporary storage 16 associated with the second network 1, merging each set of two or more partitioned files into each of the plurality of large files. The one or more large files can include one or more data backup files, as well.

In addition, in some systems according to an embodiment of the invention, the first computer 30 can further include one or more other barcode scanning devices 40 in communication with the one or more processors 31 of the first computer 30, as illustrated, for example, in FIG. 13. The second computer 10 can further include one or more displays 12 in communication with the one or more processors 11 of the second computer 10. The one or more displays 12 can also be positioned to enable scanning thereof by the one or more other barcode scanning devices 40 of the first computer 30. Securely communicating copies of contents of the one or more decoded pieces of digitally stored information in one-way communication from the temporary storage associated with the second network 1 to the first network 3 can include generating, on one or more of the one or more displays 12 of the second computer 10, one or more validation barcodes 53, as illustrated. The one or more validation barcodes 53 can be configured to encode copies of contents of the one or more decoded pieces of digitally stored information. Generating the one or more validation barcodes 53 on one or more of the one or more displays 12 of the second computer 10 can thereby enable scanning of the one or more of the one or more displays 12 of the second computer 10 by the one or more other barcode scanning devices 40 of the first computer 30. Further, the one or more pieces of digitally stored information can include one or more large files. The one or more barcode scanning devices 20 of the second computer 10 and the one or more other barcode scanning devices 40 of the first computer 30 can also be configured to scan a plurality of barcodes simultaneously. The memory medium can further include computer-readable instructions stored therein that when executed cause the second computer 10 to perform the step of, after decoding the one or more data barcodes 51, merging one or more sets of pieces of digitally stored information into one or more large files. The one or more large files can include one or more data backup files, as well.

In some systems according to an embodiment of the invention, the memory medium 34 of the first computer 30 can further include computer-readable instructions stored therein that when executed cause the first computer 30 to perform the step of, before generating one or more data barcodes 51, partitioning each of a plurality of large files into two or more partitioned files. The memory medium 14 of the second computer 10 can further include computer-readable instructions stored therein that when executed cause the second computer 10 to perform the step of, after transferring the one or more decoded pieces of digitally stored information to temporary storage associated with the second network 1, merging each set of two or more partitioned files into each of the plurality of large files. In some systems, the memory medium 14 can further include computer-readable instructions stored therein that when executed cause the second computer 10 to perform the step of, after decoding one or more data barcodes 51, merging one or more sets of pieces of digitally stored information into one or more large files.

An embodiment can also include non-transitory computer-readable medium having one or more computer programs stored therein operable by one or more processors to transfer data between two or more networks having different levels of network protection. The one or more computer programs can include a set of instructions that, when executed by the one or more processors, cause the one or more processors to perform operations. Operations can include generating one or more data barcodes 51 on a display 32 of a first computer 30 in communication with and positioned within a first network 3. The one or more data barcodes 51 can be configured to encode one or more pieces of digitally stored information positioned in the first network 3. Operations can further include decoding the one or more data barcodes 51 responsive to scanning the display 32 by use of one or more barcode scanning devices 20 in communication with a second computer 10. The second computer 10 can be positioned remote from the first computer 30 and in communication with and positioned within a second network 1. The second network 1 can have a different level of network security protection than the first network 3 and can be configured for only one-way secure communication from the second network 1 to the first network 3. Operations can also include transferring the one or more decoded pieces of digitally stored information to temporary storage associated with the second network 1. Operations can further include securely communicating copies of the one or more decoded pieces of digitally stored information in one-way direction from the second computer 10 to the first computer 30. Operations can also include generating one or more verification barcodes 52 on the display 32 of the first computer 30, responsive to comparison of the securely communicated copies of the one or more decoded pieces of digitally stored information and the one or more pieces of digitally stored information positioned in the first network 3. The one or more verification barcodes 52 can be configured to encode one or more verification files to indicate success of a data transmission from the first network 3 to the second network 1. Operations can further include decoding the one or more verification barcodes 52, responsive to scanning the display 32 of the first computer 30 by use of the one or more barcode scanning devices 20 in communication with the second computer 10. Decoding the one or more verification barcodes 52 can thereby confirm success of a data transmission from the first network 3 to the second network 1. Operations can also include storing the one or more pieces of digitally stored information in permanent storage associated with the second network 1, responsive to an indication in the one or more verification files of successful data transmission of the one or more pieces of digitally stored information. The set of instructions, when executed by the one or more processors, can further cause the one or more processors to perform the operation of discarding, responsive to an indication in the one or more verification files of unsuccessful data transmission of the one or more pieces of digitally stored information, the one or more pieces of digitally stored information in temporary storage associated with the second network 1.

In some non-transitory computer-readable medium having one or more computer programs stored therein operable by one or more processors to transfer data between two or more networks having different levels of network protection, for example, the one or more computer programs can include a set of instructions that, when executed by the one or more processors, cause the one or more processors to perform operations. Operations can include decoding one or more data barcodes 51, responsive to scanning from a display 32 of a first computer 30 in communication with and positioned within a first network 3 by use of one or more barcode scanning devices 20 in communication with a second computer 10. The second computer 10 can be positioned remote from the first computer 30 and in communication with and positioned within a second network 1. Decoding one or more data barcodes 51 can produce contents of one or more pieces of digitally stored information represented by the one or more data barcodes 51 and associated with the first network 3. The second network 1 can have a different level of network security protection than the first network 3 and be configured for only one-way secure communication from the second network 1 to the first network 3. For example, non-transitory computer-readable medium can be memory 14 of the second computer having one or more computer programs 15 stored therein, as illustrated in FIG. 13, for example. Operations can further include securely communicating copies of contents of the one or more decoded pieces of digitally stored information in one-way communication from temporary storage associated with the second network 1 to the first network 3 for comparison to the one or more pieces of digitally stored information associated with the first network 3. Operations can also include decoding—responsive to scanning the display 32 of the first computer by use of the one or more barcode scanning devices 20 in communication with the second computer 10—one or more verification barcodes 52 configured to encode one or more verification files to indicate success of transmission of the one or more pieces of digitally stored information from the first network 3 to the second network 1. Decoding the one or more verification barcodes 52 can produce contents of the one or more verification files represented by the one or more verification barcodes 52 and thereby confirm success of the transmission of the one or more pieces of digitally stored information from the first network 3 to the second network 1. Operations can further include storing contents of the one or more decoded pieces of digitally stored information in more permanent storage associated with the second network 1, responsive to an indication from contents of the one or more verification files of successful data transmission of the one or more pieces of digitally stored information associated with the first network 3 to the second network 1. The set of instructions, when executed by the one or more processors, can further cause the one or more processors to perform the operation of discarding the one or more decoded pieces of digitally stored information, responsive to an indication from contents of the one or more verification files of unsuccessful data transmission of the one or more pieces of digitally stored information.

Further, in some non-transitory computer-readable medium having one or more computer programs stored therein according to an embodiment, securely communicating copies of the one or more decoded pieces of digitally stored information in one-way direction from the second computer 10 to the first computer 30 can include generating, on a display 12 of the second computer 10, one or more validation barcodes 53. The one or more validation barcodes 53 can be configured to encode copies of the one or more decoded pieces of digitally stored information in temporary storage associated with the second network 1. Securely communicating copies of the one or more decoded pieces of digitally stored information in one-way direction from the second computer 10 to the first computer 30 can also include decoding the one or more validation barcodes 53 responsive to scanning the display 12 of the second computer 10 by use of one or more other barcode scanning devices 40 in communication with the first computer 30. Further, the one or more pieces of digitally stored information can include one or more large files. The one or more barcode scanning devices 20 in communication with the second computer 10 and the one or more other barcode scanning devices 40 in communication with the first computer 30 can also be configured to scan a plurality of barcodes simultaneously. In addition, the set of instructions, when executed by the one or more processors, can further cause the one or more processors to perform the operations of, before the generating one or more data barcodes 51, partitioning each of a plurality of large files into two or more partitioned files, and, after the transferring the one or more decoded pieces of digitally stored information to temporary storage 16 associated with the second network 1, merging each set of two or more partitioned files into each of the plurality of large files. The one or more large files can include one or more data backup files, as well. Securely communicating copies of the one or more decoded pieces of digitally stored information in one-way direction from the second computer 10 to the first computer 30 can also include transferring the decoded copies of the one or more decoded pieces of digitally stored information to storage associated with the first network 3. Additionally, in some non-transitory computer-readable medium according to an embodiment, securely communicating copies of contents of the one or more decoded pieces of digitally stored information in one-way communication from temporary storage associated with the second network 1 to the first network 3 can include decoding one or more validation barcodes 53, responsive to scanning from a display 12 of the second computer 10 by use of one or more other barcode scanning devices 40 in communication with the first computer 30. Further, the one or more validation barcodes 53 can be configured to encode one or more copies of contents of the one or more decoded pieces of digitally stored information. Further, the one or more pieces of digitally stored information can include one or more large files. The one or more barcode scanning devices 20 in communication with the second computer 10 and the one or more other barcode scanning devices 40 in communication with the first computer 30 can also be configured to scan a plurality of barcodes simultaneously. The set of instructions, when executed by the one or more processors, can further cause the one or more processors to perform the operation of, after the decoding one or more data barcodes 51, merging one or more sets of pieces of digitally stored information into one or more large files. The one or more large files can include one or more data backup files, as well.

In some non-transitory memory medium having one or more computer programs stored therein according to an embodiment, the set of instructions, when executed by the one or more processors, can further cause the one or more processors to perform the operation of, before generating one or more data barcodes 51, partitioning each of a plurality of large files into two or more partitioned files, and, after transferring the one or more decoded pieces of digitally stored information to temporary storage associated with the second network 1, merging each set of two or more partitioned files into each of the plurality of large files. In some non-transitory memory medium having one or more computer programs stored therein, the set of instructions, when executed by the one or more processors, can further cause the one or more processors to perform the operation of, after decoding one or more data barcodes, merging one or more sets of pieces of digitally stored information into one or more large files.

In the various embodiments of the invention described herein, a person having ordinary skill in the art will recognize that various types of memory are readable by a computer, such as the memory described herein in reference to the various computers and servers, e.g., computer, computer server, web server, or other computers with embodiments of the present invention. Examples of computer readable media can include but are not limited to: nonvolatile, hard-coded type media, such as read only memories (ROMs), CD-ROMs, and DVD-ROMs, or erasable, electrically programmable read only memories (EEPROMs); recordable type media, such as floppy disks, hard disk drives, CD-R/RWs, DVD-RAMs, DVD-R/RWs, DVD+R/RWs, flash drives, memory sticks, and other newer types of memories; and transmission type media such as digital and analog communication links. For example, such media can include operating instructions, as well as instructions related to the systems and the method steps described above and can operate on a computer. It will be understood by those skilled in the art that such media can be at other locations instead of, or in addition to, the locations described to store computer program products, e.g., including software thereon. It will be understood by those skilled in the art that the various software modules or electronic components described above can be implemented and maintained by electronic hardware, software, or a combination of the two, and that such embodiments are contemplated by embodiments of the present invention.

This application relates to, claims priority to and the benefit of, and incorporates by reference herein U.S. Provisional Patent Application No. 61/954,237, titled "Systems, Methods, and Computer Medium to Securely Transfer Data Between Networks Having Different Levels of Network Protection" and filed on Mar. 17, 2014. This application further relates to, claims priority to and the benefit of, and incorporates by reference herein U.S. Non-Provisional patent application Ser. No. 14/336,154, titled "Systems, Methods, and Computer Medium to Securely Transfer Business Transactional Data Between Networks Having Different Levels of Network Protection Using Barcode Technology with Data Diode Network Security Appliance" and filed the same day, Jul. 21, 2014, and concurrently herewith; U.S. Non-Provisional patent application Ser. No. 14/336,395, titled "Systems, Methods, and Computer Medium to Securely Transfer Business Transactional Data Between Physically Isolated Networks Having Different Levels of Network Protection Utilizing Barcode Technology" and filed the same day, Jul. 21, 2014, and concurrently herewith; and U.S. Non-Provisional patent application Ser. No. 14/336,423, titled "Systems, Methods, and Computer Medium to Securely Transfer Large Volumes of Data Between Physically Isolated Networks Having Different Levels of Network Protection" and filed the same day, Jul. 21, 2014, and concurrently herewith.

In the drawings and specification, there have been disclosed embodiments of methods, systems, and non-transitory computer-readable medium having computer program stored therein of the present invention, and although specific terms are employed, the terms are used in a descriptive sense only and not for purposes of limitation. The embodiments of methods, systems, and non-transitory computer-readable medium having computer program stored therein of the present invention have been described in considerable detail with specific reference to these illustrated embodiments. It will be apparent, however, that various modifications and changes can be made within the spirit and scope of the embodiments of methods, systems, and non-transitory computer-readable medium having computer program stored therein of the present invention as described in the foregoing specification, and such modifications and changes are to be considered equivalents and part of this disclosure.

That claimed is:

1. A computer-implemented method to transfer data between two or more networks configured to have different levels of network protection, the method comprising:
   partitioning each of one or more relatively large data backup files into a set of two or more relatively smaller partitioned files, the two or more relatively smaller partitioned files of each of the one or more relatively large data backup files collectively defining a plurality of partitioned files, the one or more relatively large data backup files associated with and positioned within a first network;
   decoding a plurality of data barcodes each indicative of contents of one of the plurality of partitioned files, responsive to receipt of a scan of a display of a first computer in communication with and positioned within the first network, by use of one or more barcode scanning devices in communication with a second computer positioned remote from the first computer and in communication with and positioned within a second network, to produce contents of the plurality of partitioned files represented by the plurality of data barcodes, the second network configured to have a different level of network security protection than the first network and configured to allow only one-way secure communication from the second network to the first network;
   decoding a plurality of validation barcodes indicative of contents of one or more validation files, responsive to receipt of a scan of a display of the second computer, by use of a different one or more barcode scanning devices in communication with the first computer, to produce contents of the one or more validation files represented by the plurality of validation barcodes, the one or more validation files configured to include decoded contents of the plurality of partitioned files, to thereby securely communicate decoded contents of the plurality of partitioned files in one-way communication from temporary storage associated with the second network to the first network;
   decoding one or more verification barcodes indicative of contents of one or more verification files, responsive to receipt of a scan of the display of the first computer by use of the one or more barcode scanning devices in communication with the second computer, to produce contents of the one or more verification files represented by the one or more verification barcodes, the one or more verification files configured to indicate whether successful transmission of contents of each of the plurality of partitioned files from the first network to the second network has occurred;
   merging decoded contents of each set of two or more relatively smaller partitioned files into a reassemblage of the respective one of the one or more relatively large data backup files responsive to an indication from decoded contents of the one or more verification files of successful transmission of contents of each of the plurality of partitioned files from the first network to the second network; and
   storing each reassemblage of the one or more relatively large data backup files in more permanent storage associated with the second network responsive to an indication from decoded contents of the one or more verification files of successful transmission of contents of each of the plurality of partitioned files from the first network to the second network.

2. A computer-implemented method of claim 1, wherein the plurality of partitioned files are individually separate from one another, wherein each of the one or more relatively large data backup files includes more than 1 MB of data, wherein each reassemblage of the one or more relatively large data backup files includes a copy of the respective one of the one or more relatively large data backup files, and wherein each barcode of the plurality of data barcodes, the plurality of validation barcodes, and the one or more verification barcodes is distinct from other barcodes of the plurality of data barcodes, the plurality of validation barcodes, and the one or more verification barcodes.

3. A computer-implemented method of claim 1, wherein securely communicating decoded contents of the plurality of partitioned files in one-way communication from the temporary storage associated with the second network to the first network by use of the plurality of validation barcodes thereby allows comparison to contents of each of the plurality of partitioned files positioned within the first network to determine whether one or more transmission errors exist in decoded contents of the plurality of partitioned files, and wherein the method further comprises:

generating the plurality of data barcodes on the display of the first computer;

transferring decoded contents of the plurality of partitioned files to the temporary storage associated with the second network after decoding the plurality of data barcodes;

storing decoded contents of the plurality of partitioned files in the one or more validation files in the temporary storage associated with the second network after decoding the plurality of data barcodes;

generating the plurality of validation barcodes on the display of the second computer;

transferring decoded contents of the one or more validation files to temporary storage associated with the first network after decoding the plurality of validation barcodes to thereby transfer decoded contents of the plurality of partitioned files to the first network for comparison to contents of the plurality of partitioned files;

generating the one or more verification barcodes on the display of the first computer, responsive to a comparison of the securely communicated decoded contents of the plurality of partitioned files and contents of the plurality of partitioned files positioned in the first network; and discarding decoded contents of the plurality of partitioned files in the temporary storage associated with the second network, responsive to an indication from decoded contents of the one or more verification files of unsuccessful transmission of contents of each of the plurality of partitioned files from the first network to the second network.

4. A computer-implemented method of claim 3, wherein the one or more barcode scanning devices in communication with the second computer are configured to scan a plurality of barcodes simultaneously, wherein the one or more barcode scanning devices in communication with the first computer are configured to scan a plurality of barcodes simultaneously, wherein the plurality of data barcodes are physically positioned separate from one another when generated on the display of the first computer, wherein the plurality of validation barcodes are physically positioned separate from one another when generated on the display of the second computer, and wherein the one or more verification barcodes are physically positioned separate from one another when generated on the display of the first computer.

5. A computer-implemented method of claim 1, wherein the first network comprises a high-security network and the second network comprises a low-security network, and wherein successful transmission of contents of each of the plurality of partitioned files from the first network to the second network occurs when the securely communicated decoded contents of each of the plurality of partitioned files match contents of one of the plurality of partitioned files positioned in the first network and when contents of each of the plurality of partitioned files positioned in the first network match the securely communicated decoded contents of one of the plurality of partitioned files.

6. A computer-implemented method of claim 1, wherein the first network comprises a low-security network and the second network comprises a high-security network, wherein the plurality of data barcodes are distinct from the plurality of validation barcodes and the one or more verification barcodes, and wherein the plurality of validation barcodes are distinct from the plurality of data barcodes and the one or more verification barcodes.

7. A computer-implemented method of claim 1, wherein decoding the plurality of data barcodes includes disregarding error-correction capabilities of the plurality of data barcodes; wherein the plurality of data barcodes, the plurality of validation barcodes, and the one or more verification barcodes include one or more of the following: two-dimensional matrix codes, QR Codes, Aztec Codes, and PDF417 codes; and wherein a barcode scanning device includes one or more of the following: a barcode reading device, a QR Code reading device, a field-of-view barcode reading device, and a camera.

8. A system to transfer data between two or more networks configured to have different levels of network protection, the system comprising:

a first computer in communication with and positioned within a first network, the first computer including:
one or more processors,
one or more barcode scanning devices in communication with the one or more processors,
one or more displays in communication with the one or more processors, and
non-transitory memory medium in communication with the one or more processors, the memory medium including computer-readable instructions stored therein that when executed cause the first computer to perform the steps of:
partitioning each of one or more relatively large data backup files into a set of two or more relatively smaller partitioned files, the two or more relatively smaller partitioned files of each of the one or more relatively large data backup files collectively defining a plurality of partitioned files, the one or more relatively large data backup files associated with and positioned within the first network, and
decoding a plurality of validation barcodes indicative of contents of one or more validation files, responsive to receipt of a scan of one or more of one or more displays of a second computer by use of the one or more barcode scanning devices of the first computer, to produce contents of the one or more validation files represented by the plurality of validation barcodes, and the second computer, the second computer positioned remote from the first computer and in communication with and positioned within a second network, the second network configured to have temporary storage and separate more permanent storage associated therewith, the second network further configured to have a different level of network security protection than the first network and to allow only one-way secure communication from the second network to the first network, the second computer including:
one or more processors,
one or more input and output units in communication with the one or more processors of the second computer,
one or more displays in communication the one or more processors of the second computer,
another different one or more barcode scanning devices in communication with the one or more processors of the second computer, and
non-transitory memory medium in communication with the one or more processors of the second computer, the memory medium including computer-readable instructions stored therein that when executed cause the second computer to perform the steps of:

decoding a plurality of data barcodes each indicative of contents of one of the plurality of partitioned files, responsive to receipt of a scan of one or more of the one or more displays of the first computer by use of the one or more barcode scanning devices of the second computer, to produce contents of the plurality of partitioned files represented by the plurality of data barcodes, generating the plurality of validation barcodes on one or more of the one or more displays of the second computer, the one or more validation files configured to include decoded contents of the plurality of partitioned files, to thereby securely communicate decoded contents of the plurality of partitioned files in one-way communication from the temporary storage associated with the second network to the first network, decoding one or more verification barcodes indicative of contents of one or more verification files, responsive to receipt of a scan of one or more of the one or more displays of the first computer, by use of the one or more barcode scanning devices of the second computer, the one or more verification files configured to indicate whether successful transmission of contents of each of the plurality of partitioned files from the first network to the second network has occurred, merging decoded contents of each set of two or more relatively smaller partitioned files into a reassemblage of the respective one of the one or more relatively large data backup files responsive to an indication from decoded contents of the one or more verification files of successful transmission of contents of each of the plurality of partitioned files from the first network to the second network, and storing each reassemblage of the one or more relatively large data backup files in the more permanent storage associated with the second network responsive to an indication from decoded contents of the one or more verification files of successful transmission of contents of each of the plurality of partitioned files from the first network to the second network.

9. A system of claim 8, wherein the plurality of partitioned files are individually separate from one another, wherein each of the one or more relatively large data backup files includes more than 1 MB of data, wherein each reassemblage of the one or more relatively large data backup files includes a copy of the respective one of the one or more relatively large data backup files, and wherein each barcode of the plurality of data barcodes, the plurality of validation barcodes, and the one or more verification barcodes is distinct from other barcodes of the plurality of data barcodes, the plurality of validation barcodes, and the one or more verification barcodes.

10. A system of claim 8, wherein securely communicating decoded contents of the plurality of partitioned files in one-way communication from the temporary storage associated with the second network to the first network by use of the plurality of validation barcodes thereby allows comparison to contents of each of the plurality of partitioned files positioned within the first network to determine whether one or more transmission errors exist in decoded contents of the plurality of partitioned files, and wherein the memory medium of the first computer further includes computer-readable instructions stored therein that when executed cause the first computer to perform the steps of:

generating the plurality of data barcodes on one or more of the one or more displays of the first computer, transferring decoded contents of the one or more validation files to temporary storage associated with the first network after decoding the plurality of validation barcodes to thereby transfer decoded contents of the plurality of partitioned files to the first network for comparison to contents of the plurality of partitioned files, and generating the one or more verification barcodes on one or more of the one or more displays of the first computer, responsive to a comparison of the securely communicated decoded contents of the plurality of partitioned files and contents of the plurality of partitioned files positioned in the first network; and wherein the memory medium of the second computer further includes computer-readable instructions stored therein that when executed cause the second computer to perform the steps of:

transferring decoded contents of the plurality of partitioned files to the temporary storage associated with the second network after decoding the plurality of data barcodes, storing decoded contents of the plurality of partitioned files in the one or more validation files in the temporary storage associated with the second network after decoding the plurality of data barcodes, and discarding decoded contents of the plurality of partitioned files in the temporary storage associated with the second network, responsive to an indication from decoded contents of the one or more verification files of unsuccessful transmission of contents of each of the plurality of partitioned files from the first network to the second network.

11. A system of claim 10, wherein the one or more barcode scanning devices of the second computer are configured to scan a plurality of barcodes simultaneously, wherein the one or more barcode scanning devices of the first computer are configured to scan a plurality of barcodes simultaneously, wherein the plurality of data barcodes are physically positioned separate from one another when generated on the one or more of the one or more displays of the first computer, wherein the plurality of validation barcodes are physically positioned separate from one another when generated on the one or more of the one or more displays of the second computer, and wherein the one or more verification barcodes are physically positioned separate from one another when generated on the one or more of the one or more displays of the first computer.

12. A system of claim 8, wherein the first network is a high-security network and the second network is a low-security network, and wherein successful transmission of contents of each of the plurality of partitioned files from the first network to the second network occurs when the securely communicated decoded contents of each of the plurality of partitioned files match contents of one of the plurality of partitioned files positioned in the first network and when contents of each of the plurality of partitioned files positioned in the first network match the securely communicated decoded contents of one of the plurality of partitioned files.

13. A system of claim 8, wherein the first network is a low-security network and the second network is a high-security network, wherein the plurality of data barcodes are distinct from the plurality of validation barcodes and the one or more verification barcodes, and wherein the plurality of validation barcodes are distinct from the plurality of data barcodes and the one or more verification barcodes.

14. A system of claim 8, wherein decoding the plurality of data barcodes includes disregarding error-correction capabilities of the plurality of data barcodes; wherein the plurality of data barcodes, the plurality of validation barcodes, and the one or more verification barcodes include one or more of the following: two-dimensional matrix codes, QR Codes, Aztec Codes, and PDF417 codes; and wherein a barcode scanning device includes one or more of the following: a barcode reading device, a QR Code reading device, a field-of-view barcode reading device, and a camera.

15. Non-transitory computer-readable medium having one or more computer programs stored therein operable by one or more processors to transfer data between two or more networks configured to have different levels of network protection, the one or more computer programs comprising a set of instructions that, when executed by the one or more processors, cause the one or more processors to perform the operations of:
   partitioning each of one or more relatively large data backup files into a set of two or more relatively smaller partitioned files, the two or more relatively smaller partitioned files of each of the one or more relatively large data backup files collectively defining a plurality of partitioned files, the one or more relatively large data backup files associated with and positioned within a first network;
   decoding a plurality of data barcodes each indicative of contents of one of the plurality of partitioned files, responsive to receipt of a scan of a display of a first computer in communication with and positioned within the first network, by use of one or more barcode scanning devices in communication with a second computer positioned remote from the first computer and in communication with and positioned within a second network, to produce contents of the plurality of partitioned files represented by the plurality of data barcodes, the second network configured to have a different level of network security protection than the first network and configured to allow only one-way secure communication from the second network to the first network;
   decoding a plurality of validation barcodes indicative of contents of one or more validation files, responsive to receipt of a scan of a display of the second computer, by use of a different one or more barcode scanning devices in communication with the first computer, to produce contents of the one or more validation files represented by the plurality of validation barcodes, the one or more validation files configured to include decoded contents of the plurality of partitioned files, to thereby securely communicate decoded contents of the plurality of partitioned files in one-way communication from temporary storage associated with the second network to the first network;
   decoding one or more verification barcodes indicative of contents of one or more verification files, responsive to receipt of a scan of the display of the first computer by use of the one or more barcode scanning devices in communication with the second computer, to produce contents of the one or more verification files represented by the one or more verification barcodes, the one or more verification files configured to indicate whether successful transmission of contents of each of the plurality of partitioned files from the first network to the second network has occurred;
   merging decoded contents of each set of two or more relatively smaller partitioned files into a reassemblage of the respective one of the one or more relatively large data backup files responsive to an indication from decoded contents of the one or more verification files of successful transmission of contents of each of the plurality of partitioned files from the first network to the second network; and
   storing each reassemblage of the one or more relatively large data backup files in more permanent storage associated with the second network responsive to an indication from decoded contents of the one or more verification files of successful transmission of contents of each of the plurality of partitioned files from the first network to the second network.

16. Non-transitory computer-readable medium having one or more computer programs stored therein of claim 15, wherein the plurality of partitioned files are individually separate from one another, wherein each of the one or more relatively large data backup files includes more than 1 MB of data, wherein each reassemblage of the one or more relatively large data backup files includes a copy of the respective one of the one or more relatively large data backup files, and wherein each barcode of the plurality of data barcodes, the plurality of validation barcodes, and the one or more verification barcodes is distinct from other barcodes of the plurality of data barcodes, the plurality of validation barcodes, and the one or more verification barcodes.

17. Non-transitory computer-readable medium having one or more computer programs stored therein of claim 15, wherein securely communicating decoded contents of the plurality of partitioned files in one-way communication from the temporary storage associated with the second network to the first network by use of the plurality of validation barcodes thereby allows comparison to contents of each of the plurality of partitioned files positioned within the first network to determine whether one or more transmission errors exist in decoded contents of the plurality of partitioned files, and wherein the set of instructions, when executed by the one or more processors, further cause the one or more processors to perform the operations of:
   generating the plurality of data barcodes on the display of the first computer;
   transferring decoded contents of the plurality of partitioned files to the temporary storage associated with the second network after decoding the plurality of data barcodes;
   storing decoded contents of the plurality of partitioned files in the one or more validation files in the temporary storage associated with the second network after decoding the plurality of data barcodes;
   generating the plurality of validation barcodes on the display of the second computer;
   transferring decoded contents of the one or more validation files to temporary storage associated with the first network after decoding the plurality of validation barcodes to thereby transfer decoded contents of the plurality of partitioned files to the first network for comparison to contents of the plurality of partitioned files;
   generating the one or more verification barcodes on the display of the first computer, responsive to a comparison of the securely communicated decoded contents of the plurality of partitioned files and contents of the plurality of partitioned files positioned in the first network; and
   discarding decoded contents of the plurality of partitioned files in the temporary storage associated with the second network, responsive to an indication from decoded contents of the one or more verification files of unsuccessful transmission of contents of each of the plurality of partitioned files from the first network to the second network.

18. Non-transitory computer-readable medium having one or more computer programs stored therein of claim 17, wherein the one or more barcode scanning devices in communication with the second computer are configured to scan a plurality of barcodes simultaneously, wherein the one or more barcode scanning devices in communication with the first computer are configured to scan a plurality of barcodes simultaneously, wherein the plurality of data barcodes are physically positioned separate from one another when generated on the display of the first computer, wherein the plurality of validation barcodes are physically positioned separate from one another when generated on the display of the second computer, and wherein the one or more verification barcodes are physically positioned separate from one another when generated on the display of the first computer.

19. Non-transitory computer-readable medium having one or more computer programs stored therein of claim 15, wherein the first network comprises a high-security network and the second network comprises a low-security network, and wherein successful transmission of contents of each of the plurality of partitioned files from the first network to the second network occurs when the securely communicated decoded contents of each of the plurality of partitioned files match contents of one of the plurality of partitioned files positioned in the first network and when contents of each of the plurality of partitioned files positioned in the first network match the securely communicated decoded contents of one of the plurality of partitioned files.

20. Non-transitory computer-readable medium having one or more computer programs stored therein of claim 15, wherein the first network comprises a low-security network and the second network comprises a high-security network, wherein the plurality of data barcodes are distinct from the plurality of validation barcodes and the one or more verification barcodes, and wherein the plurality of validation barcodes are distinct from the plurality of data barcodes and the one or more verification barcodes.

21. Non-transitory computer-readable medium having one or more computer programs stored therein of claim 15, wherein decoding the plurality of data barcodes includes disregarding error-correction capabilities of the plurality of data barcodes; wherein the plurality of data barcodes, the plurality of validation barcodes, and the one or more verification barcodes include one or more of the following: two-dimensional matrix codes, QR Codes, Aztec Codes, and PDF417 codes; and wherein a barcode scanning device includes one or more of the following: a barcode reading device, a QR Code reading device, a field-of-view barcode reading device, and a camera.

* * * * *